United States Patent
Yamaoka et al.

(10) Patent No.: US 10,125,236 B2
(45) Date of Patent: Nov. 13, 2018

(54) ELASTIC ROLL FOR ELECTROPHOTOGRAPHIC APPARATUS AND METHOD FOR MANUFACTURING THE SAME

(71) Applicant: Sumitomo Riko Company Limited, Komaki-shi, Aichi (JP)

(72) Inventors: Ryosuke Yamaoka, Komaki (JP); Yasunori Nimura, Komaki (JP); Takahiro Morita, Komaki (JP); Satoshi Tatsumi, Komaki (JP); Kousuke Minematsu, Komaki (JP); Junichiro Suenaga, Komaki (JP)

(73) Assignee: SUMITOMO RIKO COMPANY LIMITED, Komaki-shi (JP)

( * ) Notice: Subject to any disclaimer, the term of this patent is extended or adjusted under 35 U.S.C. 154(b) by 0 days.

(21) Appl. No.: 15/902,213

(22) Filed: Feb. 22, 2018

(65) Prior Publication Data
US 2018/0194916 A1 Jul. 12, 2018

Related U.S. Application Data

(63) Continuation of application No. PCT/JP2016/085317, filed on Nov. 29, 2016.

(30) Foreign Application Priority Data

Nov. 30, 2015 (JP) .................. 2015-233191

(51) Int. Cl.
*C08J 9/28* (2006.01)
*C08J 9/36* (2006.01)
(Continued)

(52) U.S. Cl.
CPC .............. *C08J 9/28* (2013.01); *C08J 9/0066* (2013.01); *C08J 9/36* (2013.01); *G03G 15/0233* (2013.01);
(Continued)

(58) Field of Classification Search
CPC ... C08J 9/28; G03G 15/0233; G03G 15/0808; G03G 15/162; G03G 15/2053;
(Continued)

(56) References Cited

U.S. PATENT DOCUMENTS

| | | |
|---|---|---|
| 4,766,176 A | 8/1988 | Lee et al. |
| 5,015,691 A | 5/1991 | Lewis et al. |

(Continued)

FOREIGN PATENT DOCUMENTS

| | | |
|---|---|---|
| EP | 0 363 006 A2 | 4/1990 |
| EP | 0 651 008 A1 | 5/1995 |

(Continued)

OTHER PUBLICATIONS

International Search Report dated Feb. 28, 2017, issued in International Application No. PCT/JP2016/085317 (2 pages).
(Continued)

*Primary Examiner* — Sandra Brase
(74) *Attorney, Agent, or Firm* — Westerman, Hattori, Daniels & Adrian, LLP

(57) ABSTRACT

To provide an elastic roll for an electro-photographic apparatus that includes an elastic body layer having a low hardness and being excellent in fatigue resistance, and thus is resistant to fatigue, and to provide a method for manufacturing the same.

An elastic roll 10 for an electrophotographic apparatus includes a shaft body 12, and a foamed elastic body layer 14 provided on an outer periphery of the shaft body 12, wherein the foamed elastic body layer 14 consists of a silicone rubber foamed body including a plurality of air bubbles 18 in its base material containing cross-linked silicone rubber and a reinforcement material, and wherein the foamed elastic body layer has a communication degree of 40% or more. It is
(Continued)

preferable that the elastic roll 10 should further include a skin layer 14a in the foamed elastic body layer 14 on an outer peripheral side.

20 Claims, 3 Drawing Sheets

(51) Int. Cl.

| | | |
|---|---|---|
| *G03G 15/02* | (2006.01) | |
| *G03G 15/08* | (2006.01) | |
| *G03G 15/16* | (2006.01) | |
| *G03G 15/20* | (2006.01) | |
| *G03G 15/00* | (2006.01) | |
| *C08J 9/00* | (2006.01) | |
| *F16C 13/00* | (2006.01) | |

(52) U.S. Cl.
CPC ....... *G03G 15/0808* (2013.01); *G03G 15/162* (2013.01); *G03G 15/2053* (2013.01); *G03G 15/2089* (2013.01); *G03G 15/6511* (2013.01); *C08J 2201/0504* (2013.01); *C08J 2205/044* (2013.01); *C08J 2207/00* (2013.01); *C08J 2383/04* (2013.01); *F16C 13/00* (2013.01); *G03G 2215/2051* (2013.01)

(58) Field of Classification Search
CPC ............. G03G 15/206; G03G 15/2089; G03G 2215/2051; G03G 15/1685
See application file for complete search history.

(56) References Cited

U.S. PATENT DOCUMENTS

| | | | |
|---|---|---|---|
| 5,017,654 A | 5/1991 | Togashi et al. | |
| 5,153,160 A | 10/1992 | Saruyama et al. | |
| 5,254,656 A | 10/1993 | Bilgrien et al. | |
| 5,443,873 A * | 8/1995 | Itani | G03G 15/0233 399/176 |
| 5,725,922 A * | 3/1998 | Nakamura | G03G 15/0233 252/510 |
| 5,789,334 A | 8/1998 | Nakanishi et al. | |
| 6,562,258 B1 | 5/2003 | Elsome et al. | |
| 2011/0257315 A1 | 10/2011 | Shiono et al. | |
| 2014/0356040 A1* | 12/2014 | Sakakibara | G03G 15/206 399/333 |
| 2015/0212461 A1* | 7/2015 | Abe | G03G 15/206 399/333 |

FOREIGN PATENT DOCUMENTS

| | | | |
|---|---|---|---|
| JP | 62-89721 A | 4/1987 | |
| JP | 64-45468 A | 2/1989 | |
| JP | 2-14244 A | 1/1990 | |
| JP | 2-117960 A | 5/1990 | |
| JP | 3-68659 A | 3/1991 | |
| JP | 3-139564 A | 6/1991 | |
| JP | 3-220246 A | 9/1991 | |
| JP | 4-23867 A | 1/1992 | |
| JP | 4-53873 A | 2/1992 | |
| JP | 4-53874 A | 2/1992 | |
| JP | 6-157913 A | 6/1994 | |
| JP | 7-118535 A | 5/1995 | |
| JP | 9-67440 A | 3/1997 | |
| JP | 9-244394 A | 9/1997 | |
| JP | 2000-159896 A | 6/2000 | |
| JP | 2002-12768 A | 1/2002 | |
| JP | 2002-114860 A | 4/2002 | |
| JP | 2004-70159 A | 3/2004 | |
| JP | 3712380 B2 | 11/2005 | |
| JP | 2006-159819 A | 6/2006 | |
| JP | 2008-129171 A | 6/2008 | |
| JP | 2008-150552 A | 7/2008 | |
| JP | 2009-210710 A | 9/2009 | |

OTHER PUBLICATIONS

International Search Report dated Mar. 15, 2016, issued in International Application No. PCT/JP2015/077546 (2 pages).
International Preliminary Report on Patentability (Form PCT/IPEA/409) issued in International Application No. PCT/JP2015/077546 filed Sep. 29, 2015 (4 pages).
Written Opinion dated Mar. 15, 2016, issued in Application No. PCT/JP2015/077546, w/English translation (4 pages).
Reply dated Jul. 7, 2016, issued in Japanese Application No. PCT/JP2015/077546, w/English translation (10 pages).
Non-Final Office Action dated Oct. 19, 2017, issued in U.S. Appl. No. 15/358,912 (19 pages).
International Search Report dated May 9, 2017, issued in International Application No. PCT/JP2017/012519 (2 pages).
English Abstract of JP4-29748 A; cited in U.S. Final Office Action dated May 11, 2018. (2 pages).
RN 91597-69-4 for polyvinylbutyral Scifinder 2018; cited in U.S. Final Office Action dated May 11, 2018. (5 pages).
Final Office Action dated May 11, 2018, issued in U.S. Appl. No. 15/358,912 (18 pages).

* cited by examiner

ELASTIC ROLL FOR ELECTROPHOTOGRAPHIC APPARATUS AND METHOD FOR MANUFACTURING THE SAME

TECHNICAL FIELD

The present invention relates to an elastic roll for an electrophotographic apparatus and a method for manufacturing the same, and more particularly to an elastic roll for an electrophotographic apparatus that includes a foamed elastic body layer of which the base material contains a silicone rubber foamed body, and a method for manufacturing the same.

BACKGROUND ART

In electrophotographic apparatuses using a xerography method such as a copier, a printer, and a facsimile apparatus, silicone rubber is sometimes used as the base materials of elastic body layers of elastic rolls such as a charging roll, a developing roll, a transfer roll, and a toner supply roll, a pressure roll, a fixing roll, and a paper feeding roll. The elastic body layers of the elastic rolls are required to have a low hardness, so that the silicone rubber that is the base materials may be foamed.

CITATION LIST

Patent Literature

Patent Document 1: Japanese Patent No. 3,712,380

SUMMARY OF INVENTION

Problems to be Solved by the Invention

Foamed silicone rubber can have a reduced hardness; however, recovery of the foamed silicone rubber against a pushing load gets slower to cause a problem in that the foamed silicone rubber has an unfavorable compression set to have an unfavorable fatigue resistance.

An object of the present invention is to provide an elastic roll for an electrophotographic apparatus that includes an elastic body layer having a low hardness and being excellent in fatigue resistance, and thus is resistant to fatigue, and to provide a method for manufacturing the same.

Means for Solving the Problem

In order to solve the problem described above, an elastic roll for an electrophotographic apparatus according to an embodiment of the present invention includes a shaft body, and a foamed elastic body layer provided on an outer periphery of the shaft body. The foamed elastic body layer consists of a silicone rubber foamed body including a plurality of air bubbles in its base material containing cross-linked silicone rubber and a reinforcement material. The foamed elastic body layer has a communication degree of 40% or more.

It is preferable that the base material should contain a cross-linked product of a silicone rubber composition that contains an organopolysiloxane, a cross-linking agent, a reinforcement material, and a microcapsule type catalyst consisting of resin microparticles encapsulating a cross-linking catalyst. It is preferable that the resin of the resin microparticles should have a solubility parameter of 7.9 or more. It is preferable that the reinforcement material should be at least one kind of silica and carbon. It is preferable that the content of the reinforcement material should be within the range of 0.5 to 15 parts by mass with respect to 100 parts by mass of the cross-linked silicone rubber. It is preferable that the plurality of air bubbles should have an average diameter of 50 μm or less. It is preferable that the elastic roll for an electrophotographic apparatus should further include a skin layer on an outer peripheral surface of the foamed elastic body layer. It is preferable that a distribution of the diameters of the plurality of air bubbles should indicate that 80% or more of the diameters of the plurality of air bubbles fall within the range of diameters of ±50% of the average diameter.

In another embodiment of the present invention, a method for manufacturing an elastic roll for an electrophotographic apparatus, the roll including a shaft body, and a foamed elastic body layer provided on an outer periphery of the shaft body, includes the steps of casting an emulsion compound into a molding die for forming the foamed elastic body layer, the emulsion compound containing an organopolysiloxane, a cross-linking agent, a reinforcement material, water, a surfactant having and a low HLB value, and a catalyst as necessary, to form an intermediate including a plurality of water bubbles in its base material containing cross-linked silicone rubber and the reinforcement material, and volatilizing and removing water present as the plurality of water bubbles from the intermediate to form a silicone rubber foamed body including a plurality of air bubbles in its base material containing cross-linked silicone rubber and the reinforcement material. It is preferable that the shaft body and the foamed elastic body layer should be bonded to each other via an adhesive agent having a functional group that reacts to water.

It is preferable that the emulsion compound should further contain a microcapsule type catalyst consisting of resin microparticles encapsulating a cross-linking catalyst as a catalyst. It is preferable that the molding die for forming the foamed elastic body layer is coated with an agent for forming a skin layer before the emulsion compound is cased into the molding die, and a skin layer is formed in the foamed elastic body layer on an outer peripheral surface of the foamed elastic body layer in the step of forming the silicone rubber foamed body.

Advantageous Effects of Invention

With the elastic roll for an electrophotographic apparatus according to embodiments of the present invention, since the foamed elastic body layer provided on the outer periphery of the shaft body consists of a silicone rubber foamed body including a plurality of air bubbles in its base material containing cross-linked silicone rubber and a reinforcement material, and the foamed elastic body layer has a communication degree of 40% or more, the elastic body layer can have a low hardness and can toe made resistant to fatigue.

When the elastic roll for an electrophotographic apparatus further includes a skin layer on an outer peripheral surface of the foamed elastic body layer, property variations that are caused by the air bubbles can be suppressed. In addition, since the shaft body and the foamed elastic body layer are bonded to each other via an adhesive agent having a functional group that reacts to water, reduction in adhesive properties between the shaft body and the foamed elastic body layer can be suppressed even when the foamed elastic body layer consists of the silicone rubber foamed body having a communication degree of 40% or more.

MODE FOR CARRYING OUT THE INVENTION

Figure 1A:
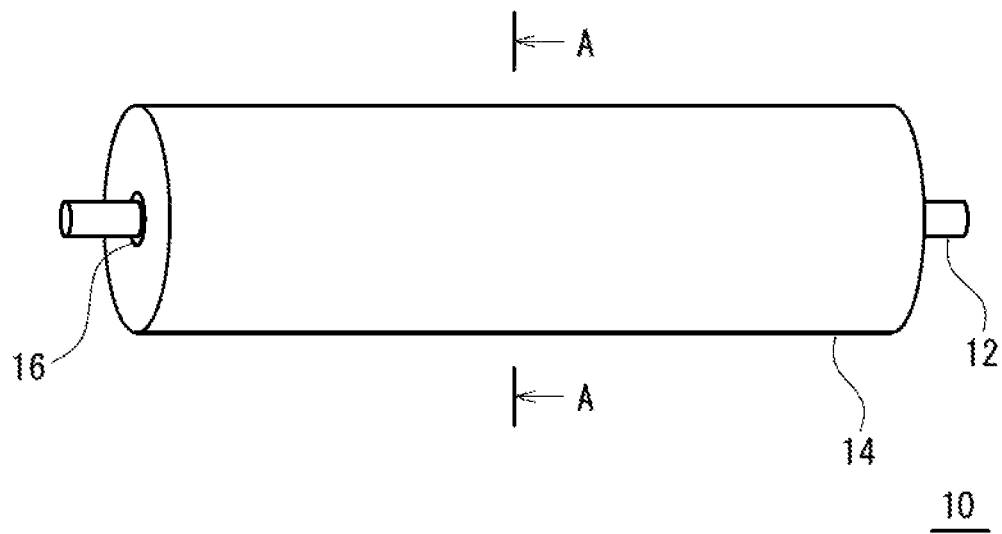
FIG. 1A is an external perspective view of an elastic roll for an electrophotographic apparatus according to one embodiment of the present invention.

Hereinafter, a specific description of configurations of the present invention will be provided referring to the drawings.

Figure 1B:
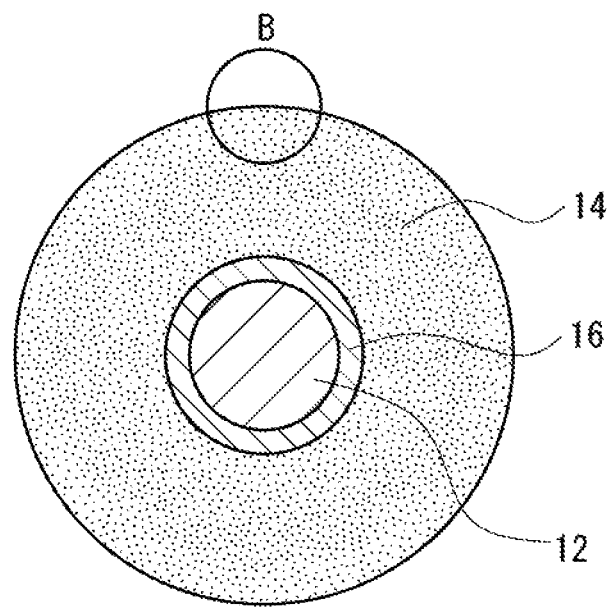
FIG. 1B is a cross-sectional view in the circumferential direction of the same taken along the line A-A of FIG. 1A.
Figure 2:
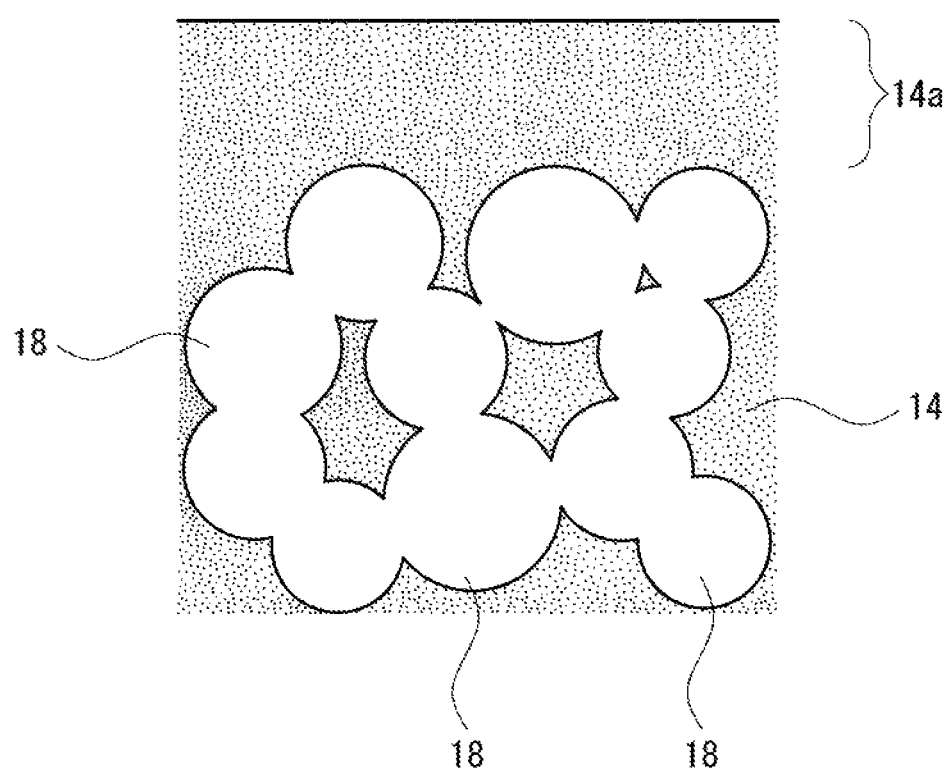
FIG. 2 is an enlarged cross-sectional view of a portion of the foamed elastic body layer illustrated in FIGS. 1A and 1B, the portion being close to the layer surface (enlarged view of B portion).

FIGS. 1A and 1B illustrate an elastic roll for an electrophotographic apparatus according to one embodiment of the present invention (hereinafter, referred to sometimes as the present elastic roll). FIG. 2 illustrates an enlarged portion of the foamed elastic body layer illustrated in FIGS. 1A and 1B, the portion being close to the layer surface.

As illustrated in FIGS. 1A and 1B, the present elastic roll 10 includes a shaft foody 12, a foamed elastic body layer 14 provided on the outer periphery of the shaft body 12, and an adhesive layer 16 provided between the shaft body 12 and the foamed elastic body layer 14. As illustrated in FIG. 2, the foamed elastic foody layer 14 consists of a silicone rubber foamed body including a plurality of air bubbles 18 in its base material (solid phase) containing cross-linked silicone rubber and a reinforcement material. The plurality of air bubbles 18 are uniformly distributed in the base material in the circumferential direction, the thickness direction, and the longitudinal direction of the entire foamed elastic body layer 14. Including the plurality of air bubbles 18 in the base material, the foamed elastic body layer 14 is more excellent in flexibility and has a lower hardness than a solid elastic body layer including no air bubbles 18. The foamed elastic body layer 14 with a reduced hardness allows an increased ground contact area (nip width) to contribute to high speed printing. In addition, the amount of used material can be made smaller than the solid elastic body layer by the amount of the air bubbles 18, which also contributes to reduction in material cost.

A part of or all of the plurality of air bubbles 18 are connected (communicate) with one another in the base material of the foamed elastic body layer 14. To be specific, the foamed elastic body layer 14 is like a sponge in which a part of or all of the plurality of air bubbles 18 are connected with one another. The air bubbles 18 are a vapor phase, and the portions among the air bubbles 18 are a solid phase (resin phase) consisting of the base material. While the foamed elastic body layer 14 can have a reduced hardness by including the plurality of air bubbles 18, recovery of the foamed elastic body layer 14 against a pushing load gets slower to cause a problem in that the foamed elastic body layer 14 has an unfavorable compression set to have an unfavorable fatigue resistance. However, since the plurality of air bubbles 18 communicate with one another in the base material in the foamed elastic body layer 14, the foamed elastic body layer 14 has an improved compression set to have an improved fatigue resistance. In addition, the foamed elastic body layer 14 can have a further reduced hardness.

The degree of connection among the plurality of air bubbles 18 is expressed by the communication degree of the foamed elastic body layer 14. The communication degree of the foamed elastic body layer 14 can be found based on the amount of liquid absorption. As the amount of liquid absorption is larger, the plurality of air bubbles 18 are more connected with one another. In the present invention, the communication degree of the foamed elastic body layer 14 is set to be 40% or more. Thus, the foamed elastic body layer 14 has an improved compression set to have an excellent fatigue resistance. If the communication degree is less than 40%, the foamed elastic body layer 14 has an unsatisfying fatigue resistance. The communication degree of the foamed elastic body layer 14 is preferably 50% or more, more preferably 60% or more, and still, more preferably 70% or more from the viewpoint of having a low hardness and an excellent fatigue resistance.

The foaming ratio of the foamed elastic body layer 14 relates to the amount of the air bubbles 18. The foaming ratio of the foamed elastic body layer 14 is preferably 1.2 times or more and more preferably 1.5 times or more from the viewpoint that the foamed elastic body layer 14 can have a satisfying low hardness. On the other hand, the foaming ratio of the foamed elastic body layer 14 is preferably 10 times or less and more preferably three times or less from the viewpoint that the foamed elastic body layer 14 can secure a sufficient strength. The foaming ratio of the foamed elastic body layer 14 can be found based on the specific gravity of the base material and the mass and the volume of the foamed elastic body layer 14. In addition, the foaming ratio of the foamed elastic body layer 14 can be found based on a cross-sectional picture of the foamed elastic body layer 14 taken with the use of a laser microscope.

The plurality of air bubbles 18 are fine and have small variations in size in the base material of the foamed elastic body layer 14. The diameters of the air bubbles 18 can be measured based on a cross-sectional picture of the foamed elastic body layer 14 taken with the use of a laser microscope. The average diameter of the air bubbles 18 can be found by measuring the diameters of 90% of the air bubbles 18 showing up in the photographing ranges of 200 μm per side at given three positions and calculating the average of the measured diameters. The average diameter of the air bubbles 18 is preferably 80 μm or less from the viewpoint of suppressing property variations (variations in hardness, electrical resistance, and the like) in the present elastic roll 10 that are caused by the air bubbles 18. The average diameter is more preferably 50 μm or less, still more preferably 30 μm or less, and still more preferably 20 μm or less. On the other hand, the average diameter of the air bubbles 18 is preferably 0.01 μm or more and more preferably 0.1 μm or more from the viewpoint that the reduced hardness achieved by the air bubbles 18 can be sufficiently secured and that the air bubbles 18 can be more easily communicated with one another. In addition, it is preferable that a distribution of the diameters of the plurality of air bubbles 18 should indicate that 80% or more of the diameters of the plurality of air bubbles 18 fall within the range of diameters of +50% of the average diameter of the plurality of air bubbles 18 from the viewpoint that small variations in diameter of the air bubbles 18 can suppress property variations in the present elastic roll 10 that are caused by the air bubbles 18.

A skin layer 14a is provided in the foamed elastic body layer 14 on the outer peripheral side. As illustrated in FIG.

2, the skin layer 14a defines a portion of the foamed elastic body layer 14, the portion included in the range of a predetermined thickness in the thickness direction from the outer peripheral surface on the outer peripheral side of the foamed elastic body layer 14, where the content ratio of the air bubbles 18 is smaller than that of the inside of the foamed elastic body layer 14. The content ratio of the air bubbles 18 can be calculated based on a cross-sectional picture of the foamed elastic body layer 14 taken with the use of a laser microscope. The content ratio of the air bubbles 18 can be calculated based on the total area of the air bubbles 18 shoving up in the photographing range of 200 µm per side. The average content ratio of the air bubbles 18 can be found by calculating the total areas of the air bubbles 18 shoving up in the photographing ranges of 200 µm per side at given three positions and calculating the average of the calculated total areas.

Presence of the skin layer 14a can alleviate the influence by the air bubbles 18 being in the vicinity of the outer periphery of the foamed elastic body layer 14, and can suppress property variations (variations in hardness, electrical resistance, and the like) in the present elastic roll 10 that are caused by the air bubbles 18. Considering that this effect can be sufficiently exerted, it can be assessed that the skin layer 14a is present on the outer periphery of the foamed elastic body layer 14 when the average content ratio of the air bubbles 18 being in the vicinity of the outer periphery of the foamed elastic body layer 14 is 40% or less of the average content ratio of the air bubbles 18 being inside of the foamed elastic body layer 14. For example, the foaming ratio of two times means that the average content ratio of the air bubbles 18 being inside of the foamed elastic body layer 14 is theoretically 50%. When the average content ratio of the air bubbles 18 being on the outer periphery of the foamed elastic body layer 14 is 20% or less (that is, when the average content ratio of the air bubbles 18 being on the outer periphery is 40% of the average content ratio of the air bubbles 18 being inside), it can be assessed that the skin layer 14a is present on the outer periphery of the foamed elastic body layer 14. In addition, the average content ratio of the air bubbles 18 being on the outer periphery the foamed elastic body layer 14 is preferably 30% or less of the average content ratio of the air bubbles 18 being inside of the foamed elastic body layer 14.

The skin layer 14a preferably has a thickness of not less than a tenth of the average diameter of the air bubbles 18 of the foamed elastic body layer 14 from the viewpoint of alleviating the influence by the air bubbles 18 being in the vicinity of the outer periphery of the foamed elastic body layer 14, and having a beneficial effect on suppressing property variations (variations in hardness, electrical resistance, and the like) in the present elastic roll 10 that are caused by the air bubbles 18. The thickness of the skin layer 14a is more preferably not less than a third of the average diameter of the air bubbles 18 of the foamed elastic body layer 14, still more preferably not less than a half, and still more preferably not less than the same. Meanwhile, the thickness of the skin layer 14a is preferably not more than fifty times of the average diameter of the air bubbles 18 of the foamed elastic body layer 14 from the viewpoint of sufficiently exerting effects such as a reduced hardness achieved by the air bubbles 18 of the foamed elastic body layer 14. The thickness of the skin layer 14a is more preferably not more than 20 times of the average diameter of the air bubbles 18 of the foamed elastic body layer 14.

The foamed elastic body layer 14 can be prepared by foaming to cure a silicone rubber composition. Examples of a foaming method include a chemical foaming method, a mechanical foaming method, an emulsion foaming method, and a balloon foaming method. The chemical foaming method defines a method for foaming a material at the time of curing (foaming) the material using an organic or inorganic chemical foaming agent. Examples of the chemical foaming agent include organic foaming agents such as an azodicarbonamide, and inorganic foaming agents such as sodium bicarbonate. The mechanical foaming method defines a method for forcibly putting externally-introduced gas such as carbon dioxide into a material to mechanically stir to foam the material. The emulsion foaming method defines a method for dispersing water in an uncured material in advance to cure the material in the water-dispersed state, and then removing the water from the cured product. The balloon foaming method defines a method for forming cells by dispersing hollow particles in an uncured material in advance to cure the material, and then removing the balloons from the cured product, or breaking the balloons.

The chemical foaming method defines a method for generating bubbles 18 during curing, in which the bubbles 18 tend to be increased in size non-uniformly. In contrast, all of the mechanical foaming method, the emulsion foaming method, and the balloon foaming method define a foaming method in which bubbles are already included in the material before curing (before forming), and the material including bubbles is cured as it is, so that the bubbles 18 are easily reduced in size uniformly. Thus, the latter foaming methods are preferred when the material is configured to include bubbles 18 that are fine and have small variations in size. However, since the bubbles 18 are dispersed uniformly in the thickness direction, the circumferential direction, and the longitudinal direction of the foamed elastic body layer 14 in the latter foaming methods, the skin layer 14a is not formed as it is. In the emulsion foaming method among the latter foaming methods, a skin layer 14a can be formed by controlling the cell motility on the forming interface. Thus, the emulsion foaming method is particularly preferred as a foaming method.

The silicone rubber composition contains an organopolysiloxane, a cross-linking agent, and a reinforcement material. Additives that can be added to the silicon rubber may be added to the silicon rubber composition if necessary within a range that does not impair the present invention. Examples of the additives include a conductive agent, a filler, a cross-linking accelerator, a cross-linking retarder, a cross-linking aid, a scorch retarder, an antioxidant, a softening agent, a plasticizer, a lubricant, a heat stabilizer, a flame retardant, a flame retardant aid, an ultraviolet absorber, and a rust inhibitor.

The base material of the foamed elastic body layer 14 contains a cross-linked product of the silicone rubber composition. The silicone rubber composition contains a cross-linking catalyst as necessary. The cross-linking catalyst is for promoting the cross-linking reaction of the organopolysiloxane by the cross-linking agent. The cross-linking catalyst may be of a microcapsule type. The microcapsule type catalyst consists of resin microparticles encapsulating the above-described cross-linking catalyst. It is preferable that the resin microparticles should be solid at least at room temperature, and have an average particle diameter of 30 µm or less. The average particle diameter is a median size measured with the use of a laser microscope. The average particle diameter of the resin microparticles is preferably 10 µm or less, and more preferably 5 µm or less from the viewpoint of enhancing the dispersibility of the cross-linking catalyst. In addition, the average particle diameter of the resin microparticles is preferably 0.1 μm or more, and more preferably 2 μm or more from the viewpoint of increasing the microparticle recovery rate at the time of producing.

The resin of the resin microparticles preferably has a solubility parameter (SP value) of 7.9 or more. Because the resin of the resin microparticles has the solubility parameter that greatly deviates from the solubility parameter of the silicone rubber that is the base polymer of the silicone rubber composition, the resin of the resin microparticles has lowered compatibility with the silicone rubber, which can prevent the resin microparticles from dissolving or swelling during storage, whereby the sustained release properties of the encapsulated cross-linking catalyst are diminished, which allows the silicone rubber composition to have improved storage stability. When having a solubility parameter of 8.3 or more, the resin of the resin microparticles has further lowered compatibility with the silicone rubber, which allows the silicone rubber composition to have significantly improved storage stability. In addition, the resin of the resin microparticles preferably has a solubility parameter of 20 or less, more preferably has a solubility parameter of 15 or less, and still more preferably has a solubility parameter of 12 or less. The solubility parameters of 20 or less deviate from the solubility parameter of water (23.4), so that the resin of the resin microparticles has lowered compatibility with water, and less interacts with the hydrophilic portion of a surfactant, which less prevent emulsion formation to be described later while easily preventing reduction in foaming ratio and variations in the cells (air bubbles). The solubility parameters can be calculated based on the molecular structures by using the calculating method of small.

The resin of the resin microparticles may be either of a thermoplastic resin and a thermosetting resin. Among them, a thermosetting resin is preferred from the viewpoint that the thermosetting resin has, by being cross-linked, a compression set that is not deteriorated. Examples of the resin of the resin microparticles include an epoxy resin, an acrylic resin, a polyvinyl butyral resin, a styrene-based polymer, a silicone resin, a polycarbonate resin, a polyester resin, an unsaturated polyester resin, an alkyd resin, a urea resin, a melamine resin, a vinyl chloride resin, a polyurethane resin, a polyether sulfone resin, a polysulfone resin, a polyphenylene sulfide resin, a phenol resin, a diallyl phthalate resin, and a polyvinyl alcohol resin. Among them, a single kind of resin may be used alone, or two or more kinds of resins may be used in combination. Examples of the thermosetting resin include a polyvinyl butyral resin, an epoxy resin, an unsaturated polyester resin, a phenol resin, a resol resin, an alkyd resin, a urea resin, a melamine resin, a polyurethane resin, and a diallyl phthalate resin.

The acrylic resin includes both of a polymer containing an acrylate as a monomer and a polymer containing a methacrylate as a monomer. In addition, the acrylic resin includes a polymer containing an acrylate and a methacrylate as monomers. Among them, a polymer containing an acrylate and a methacrylate as monomers, and a polymer containing only a methacrylate as a monomer are preferred from the viewpoint that the solid state can be maintained at normal temperature. The acrylic resin may be a homopolymer synthesized from monomers of a single kind, or a copolymer synthesized from monomers of two or more kinds. The copolymer is preferred as the acrylic resin from the viewpoint that the glass-transition temperature can be easily adjusted to low temperatures of 100 degrees C. or less, or 85 degrees C. or less. Among the acrylic resins, the copolymer of ethyl methacrylate and methyl methacrylate is particularly preferred from the viewpoint that the glass-transition temperature can be adjusted to low temperatures of 85 degrees C. or less.

Examples of the acrylic monomer and the methacrylic monomer include alkyl (meth)acrylates, cycloalkyl (meth)acrylates, halogenated alkyl (meth)acrylates, (meth)acrylates having a hydroxyl group, alkoxyalkyl (meth)acrylates, phenoxyalkyl (meth)acrylates, and alkoxy alkylene glycol (meth)acrylates. Specific examples thereof include alkyl (meth)acrylates such as a methyl (meth)acrylate, an ethyl (meth)acrylate, a propyl (meth)acrylate, a butyl (meth)acrylate, an isoamyl (meth)acrylate, a 2-ethylhexyl (meth)acrylate, a lauryl (meth)acrylate, and a stearyl (meth)acrylate, cycloalkyl (meth)acrylates such as a cyclohexyl (meth)acrylate, halogenated alkyl (meth)acrylates such as a chloroethyl (meth)acrylate and a chloropropyl (meth)acrylate, (meth)acrylates having a hydroxyl group such as a 2-hydroxyethyl (meth)acrylate, a 2-hydroxypropyl (meth)acrylate, a 2-hydroxybutyl (meth)acrylate, a 3-chloro-2-hydroxypropyl (meth)acrylate, and a β-hydroxy-β'-(meth)acryloyloxyethyl phthalate, alkoxyalkyl (meth)acrylates such as a methoxyethyl (meth)acrylate, an ethoxyethyl (meth)acrylate, and a butoxyethyl (meth)acrylate, phenoxyalkyl (meth)acrylates such as a phenoxyethyl acrylate and a nonyl phenoxyethyl (meth)acrylate, alkoxy alkylene glycol (meth)acrylates such as an ethoxy diethylene glycol (meth)acrylate, a methoxy triethylene glycol (meth)acrylate, and a methoxy dipropylene glycol (meth)acrylate, a 2,2-dimethylaminoethyl (meth)acrylate, a 2,2-diethylaminoethyl (meth)acrylate, a 2-hydroxyethyl (meth)acrylate, and a 3-chloro-2-hydroxypropyl (meth)acrylate.

In addition, specific examples of the acrylic monomer and the methacrylic monomer include alkyldiol di(meth)acrylates such as a 1,9-nonanediol di(meth)acrylate, polyethylene glycol di(meth)acrylates such as a diethylene glycol di(meth)acrylate, polypropylene glycol di(meth)acrylates such as a dipropylene glycol di(meth)acrylate, a trimethylolpropane tri(meth)acrylate, a pentaerythritol tri(meth)acrylate, a pentaerythritol tetra(meth)acrylate, a glycerol tri(meth)acrylate, polyvalent (meth)acrylates obtained by the addition reaction of a compound having an ethylenically unsaturated bond and active hydrogen such as an unsaturated carboxylic acid and an unsaturated alcohol with an ethylene glycol diglycidylether, polyvalent (meth)acrylates obtained by the addition reaction of a compound having active hydrogen such as a carboxylic acid and an amine with an unsaturated epoxy compound such as a glycidyl (meth)acrylate, polyvalent (meth)acrylamides such as a methylene bis(meth)acrylamide, and polyvalent vinyl compounds such as a divinyl benzene.

The styrene-based polymer may be a homopolymer synthesized from monomers of a single kind, or a copolymer synthesized from monomers of two or more kinds. Copolymers are preferred as the styrene-based polymer. Examples of the styrene-based polymer include a styrene-maleic anhydride copolymer (SMA), a styrene-butadiene copolymer (SBS), a styrene-isoprene copolymer (SIS), a hydrogenated styrene-butadiene copolymer (SEBS), a hydrogenated styrene-isoprene copolymer (SEPS), a styrene-acrylonitrile copolymer (SAN), and an acrylonitrile-butadiene-styrene copolymer (ABS).

The microcapsule type catalyst can be produced in a conventionally known method, preferably in a suspension polymerization method, an emulsion polymerization method, a spray-dryer method, an in-liquid drying method, or the like from the viewpoint of productivity and sphericity.

In producing the microcapsule type catalyst in the suspension polymerization method or the emulsion polymerization method, the cross-linking catalyst is dispersed as solid core substances in an organic solvent that does not dissolve the cross-linking catalyst, and the monomers are polymerized in a polymerization method including the suspension polymerization method and the emulsion polymerization method in the dispersion liquid, whereby the surfaces of the core substances are coated with polymers. The microcapsule type catalyst that is made of resin microparticles encapsulating the cross-linking catalyst is obtained in this manner.

In producing the microcapsule type catalyst in the in-liquid drying method, the cross-linking catalyst and the resin that encapsulates the cross-linking catalyst are dissolved in an organic solvent that is insoluble in water, and the resulting liquid solution is dropped into a water solution of a surfactant to produce an emulsion. Then, after reducing the pressure to remove the organic solvent from the emulsion, an encapsulated catalyst is obtained by filtering the emulsion.

The content of the metal atoms of the cross-linking catalyst in the microcapsule type catalyst is preferably 5% by mass or less, and more preferably 0.8% by mass or less from the viewpoint that the cross-linking catalyst can be sufficiently coated with the resin to secure excellent storage stability. In addition, the content is preferably 0.01% by mass or more, and more preferably 0.3% by mass or more from the viewpoint that the cross-linking catalyst can secure excellent catalytic activity.

Although depending on the content of the cross-linking catalyst in the microcapsule type catalyst, the content of the microcapsule type catalyst in the silicone rubber composition can be within the range of 0.01 to 5.0 parts by mass with respect to 100 parts by mass of the organopolysiloxane when the content of the cross-linking catalyst in the microcapsule type catalyst is within the above described predetermined range. In addition, when a metallic catalyst is used as the cross-linking catalyst, the content of the microcapsule type catalyst is generally within the range of 1 ppm to 1.0 part by mass in terms of metallic amount with respect to 100 parts by mass of the organopolysiloxane.

Organopolysiloxanes have an organic group. The organic group defines a monovalent substituted or unsubstituted hydrocarbon group. Examples of the unsubstituted hydrocarbon group include alkyl groups such as a methyl group, an ethyl group, a propyl group, a butyl group, a hexyl group, and a dodecyl group, aryl groups such as a phenyl group, and aralkyl groups such as a β-phenylethyl group and a β-phenylpropyl group. Examples of the substituted hydrocarbon group include a chloromethyl group. In general, organopolysiloxanes having a methyl group as the organic group are used as the organopolysiloxane from the viewpoint of easy synthesis. While organopolysiloxanes of a straight-chain type are preferred, branched organopolysiloxanes or circular organopolysiloxanes may be used.

Organopolysiloxanes have, depending on their cross-linking mechanisms (curing mechanisms), predetermined reactive groups (functional groups). Examples of the reactive groups include alkenyl groups (a vinyl group, an allyl group, a butenyl group, a pentenyl group, and a hexenyl group) and a silanol group. Alkenyl group-containing organopolysiloxanes are cross-linked by the peroxide-cross-linking reaction of an organic peroxide as a cross-linking agent or by the addition reaction of a hydrosilyl group-containing organopolysiloxane (an organohydrogenpolysiloxane) as a cross-linking agent. In the addition reaction, a hydrosilylation catalyst can be used in combination. Organopolysiloxanes having silanol groups are cross-linked by a condensation reaction. In the condensation reaction, a condensing cross-linking agent can be used in combination.

The alkenyl group-containing an organopolysiloxane preferably has at least two alkenyl groups in one molecule. The hydrosilyl group-containing organopolysiloxane preferably has at least two hydrosilyl groups in one molecule. The silanol group-containing organopolysiloxane preferably has at least two silanol groups in one molecule.

Examples of an organic peroxide include a benzoyl peroxide, a 2,4-dichlorobenzoyl peroxide, a p-methylbenzoyl peroxide, an o-methylbenzoyl peroxide, a dicumyl peroxide, a cumyl-t-butyl peroxide, a 2,5-dimethyl-2,5-di-t-butyl peroxy hexane, and a di-t-butyl peroxide. Among them, a dicumyl peroxide, a cumyl-t-butyl peroxide, a 2,5-dimethyl-2,5-di-t-butyl peroxy hexane, and a di-t-butyl peroxide are preferred from the viewpoint of imparting an especially low compression set.

The additive amount of the organic peroxide is not particularly limited; however, it is generally within the range of 0.1 to 10 parts by mass with respect to 100 parts by mass of alkenyl group-containing organopolysiloxane.

Specific examples of the hydrosilyl group-containing organopolysiloxane (organohydrogenpolysiloxane) include a methylhydrogenpolysiloxane with both terminals blocked with trimethylsiloxy groups, a dimethylsiloxane-methylhydrogensiloxane copolymer with both terminals blocked with trimethylsiloxy groups, a dimethylpolysiloxane with both terminals blocked with dimethylhydrogensiloxy groups, a dimethylsiloxane-methylhydrogensiloxane copolymer with both terminals blocked with dimethylhydrogensiloxy groups, a methylhydrogensiloxane-diphenylsiloxane copolymer with both terminals blocked with trimethylsiloxy groups, a methylhydrogensiloxane-diphenylsiloxane-dimethylsiloxane copolymer with both terminals blocked with trimethylsiloxy groups, a copolymer consisting of ½ unit of $(CH_3)_2HSiO$ and 4/2 units of $SiO$, and a copolymer consisting of ½ unit of $(CH_3)_2HSiO$, 4/2 unite of $SiO$, and 3/2 units of $(C_6H_5)SiO$.

The content of the hydrosilyl group-containing organopolysiloxane is not particularly limited; however, the content is generally within the range of 0.1 to 40 parts by mass with respect to 100 parts by mass of the alkenyl group-containing organopolysiloxane.

Examples of the hydrosilylation catalyst include a platinum catalyst, a ruthenium catalyst, and a rhodium catalyst. Examples of the platinum catalyst include microparticulate platinum, platinum black, platinum carrying active carbon, platinum carrying silica, chloroplatinic acid, an alcohol solution of chloroplatinic acid, an olefin complex of platinum, and an alkenyl siloxane complex of platinum.

The additive amount of the hydrosilylation catalyst is not particularly limited; however, it is generally within the range of 1 ppm to 1 part by mass in terms of metallic amount of platinum-based metal with respect to 100 parts by mass of the alkenyl group-containing organopolysiloxane.

Silane having at least two, preferably at least three hydrolyzable groups in one molecule or partial hydrolysis condensate thereof is used as the condensing cross-linking agent. In this case, examples of the hydrolyzable groups include alkoxy groups such as a methoxy group, an ethoxy group, and a butoxy group, ketoxime groups such as a dimethyl ketoxime group and a methyl ethyl ketoxime group, acyloxy groups such as an acetoxy group, alkenyloxy groups such as an isopropenyloxy group and an isobutenyloxy group, amino groups such as an N-butylamino group and an N,N-diethylamino group, and amide groups such as an N-methylacetamide group.

The additive amount of the condensing cross-linking agent is not particularly limited; however, it is generally within the range of 1 to 50 parts by mass with respect to 100 parts by mass of the silanol group-containing organopolysiloxane.

Examples of the reinforcement material include fumed silica, precipitated silica, fused silica, carbon black, quartz powder, silicone particles, diatomaceous earth, aluminum silicate, titanium oxide, alumina, calcium carbonate, zinc oxide, iron oxide, and zinc carbonate. Among them, fumed silica, precipitated silica, fused silica, and carbon black are preferred from the viewpoint of the reinforcing effect with respect to the additive amount. The content of the reinforcement material is preferably 0.5 parts by mass or more, more preferably 1.0 part by mass or more, and still more preferably 3.0 parts by mass or more with respect to 100 parts by mass of the cross-linked silicone rubber from the viewpoints that the communication degree of the foamed elastic body layer 14 can be ensured, the plurality of air bubbles 18 in the foamed elastic body layer 14 can be made fine and made to have small variations in size, and the strength of the foamed elastic body layer 14 can be ensured. On the other hand, the content of the reinforcement material is preferably 18 parts by mass or less, more preferably 15 parts by mass or less, and still more preferably 10 parts by mass or less with respect to 100 parts by mass of the cross-linked silicone rubber from the viewpoints that the communication degree of the foamed elastic body layer 14 can be ensured, and the plurality of air bubbles 18 in the foamed elastic body layer 14 can be made fine and made to have small variations in size.

Examples of the conductive agent include electroconductive agents such as carbon black, graphite, a conductive titanium oxide, a conductive zinc oxide, and a conductive tin oxide, ion conductive agents such as a quaternary ammonium salt, a borate salt, a surfactant, and an ionic liquid. The content of the conductive agent is appropriately selected depending on the desired physical properties.

In performing emulsion foaming, an emulsion compound containing the above-described silicone rubber composition (silicone compound) is prepared. The emulsion compound contains at least a silicone compound, a surfactant, and water. The emulsion compound may contain a stabilizer for stabilizing water bubbles, an additive for controlling (raising or lowering) the boiling point of water, or the like. Examples of the boiling point elevator include salt. With the use of salt water, high temperature forming at 100 degrees C. or more is possible.

A surfactant defines a compound having both of a hydrophilic region and a hydrophobic region. A surfactant having a low HLB value is used in order to disperse water in silicone. The HLB value represents the degree of affinity for water and oil. There are values of zero to 20 in the HLB values. As the HLB value gets closer to zero, the surfactant has a higher lipophilic property, and as the HLB value gets closer to 20, the surfactant has a higher hydrophilic property. A W/O type emulsion in which water is dispersed in silicone can be obtained with the use of a surfactant having a low HLB value. The HLB value of the surfactant is preferably within the range of zero to 15, and more preferably within the range of 2 to 7. Examples of the preferably used surfactant having a low HLB value include a fatty alcohol polyglycol ether, a partially saponified polyvinyl alcohol, an alkyl sulfate, a polyoxyethylene-oleyl ether, a polyoxyethylene-lauryl ether, and an ether-modified silicone oil. Among them, a single kind of surfactant may be used alone, or two or more kinds of surfactants may be used in combination. Among them, an ether-modified silicone oil is preferred from the viewpoint of compatibility with silicone polymer.

In the emulsion compound, the content of water is preferably within the range of 10 to 1000 parts by mass, and more preferably within the range of 50 to 200 parts by mass with respect to 100 parts by mass of the silicone compound. In addition, the content of the surfactant is preferably within the range of 0.01 to 50 parts by mass, and more preferably within the range of 0.5 to 10 parts by mass with respect to 100 parts by mass of the silicone compound.

By dispersing the water into the silicone in the emulsion, compound, a silicone rubber foamed, body having a plurality of air bubbles 18 that are fine and have small variations in size in a base material containing cross-linked silicone rubber and a reinforcement material is obtained after curing. The viscosity of the emulsion compound is important in order to disperse water into silicone. The viscosity of the emulsion compound is preferably within the range of 0.1 to 2000 Pa·s. When the viscosity is 2000 Pa·s or less, the interacting force among silicone molecules is reduced to make it easy to increase the communication degree. When the viscosity is 0.1 Pa·s or more, the silicone can easily keep drops of water to make water bubbles that are fine and have small variations in size. The viscosity of the emulsion compound is more preferably within the range of 1 to 1000 Pa·s, and still more preferably within the range of 10 to 500 Pa·s. The viscosity of the emulsion compound can be adjusted by the viscosity of the silicone compound, the content of the water, or the like. The viscosity of the silicone compound can be adjusted by the viscosity of the organopolysiloxane, the content of reinforcement material (e.g., silica), or the like. The viscosity of the emulsion compound is measured with the use of a rheometer under the condition of 25 degrees C.

The emulsion compound can be stirred with the use of a stirring blade, a planetary mixer, a kneader, a roll kneader, or the like in accordance with its viscosity.

Preparation of the foamed elastic body layer 14 in the emulsion foaming method is described below.

(1) First, an emulsion compound is prepared (2) Next, the prepared emulsion compound is casted into a molding die that is temperature-modulated at a forming temperature to be kept for a predetermined time while the forming temperature is maintained to form (cure) silicone rubber.

(3) Next, the formed product (cured product) was removed from the molding die to be kept at a predetermined temperature for a predetermined time, and the water present in the formed product (cured product) is volatilized and removed.

In emulsion foaming, the foaming ratio can be adjusted by the combination ratio between the silicone and the water in the emulsion compound. The size, variations in size, and the communication degree of the air bubbles 18 in the foamed elastic body layer 14 can be adjusted by the viscosity of the emulsion compound, the strength of the silicone in the emulsion compound, or the like. The viscosity of the emulsion compound can be adjusted by the viscosity of the silicone compound, the content of the water, or the like as described above. The viscosity of the silicone compound can be adjusted by the viscosity of the organopolysiloxane, the content of the reinforcement material (e.g., silica), or the like. It is preferable that the content of the reinforcement material (e.g., silica) in the silicone compound should be within the above-described range.

In the forming step of (2), the silicone rubber needs to be formed at low temperature so that the water In the emulsion compound is not volatilized to be removed. To be specific, the forming temperature needs to be set at temperatures at which water does not evaporated, which are smaller than or equal to the boiling temperature (100 degrees C. at ordinary temperatures and normal pressure). The more preferable setting temperature is smaller than or equal to 5 degrees below the boiling point, and still more preferable setting temperature is smaller than or equal to 10 degrees below the boiling point. It is to be noted that when a boiling point elevator is contained in the water, the boiling point of the boiling point elevator is used as a standard.

When the silicone rubber is subjected to the low-temperature forming, the adhesive properties between the foamed elastic body layer 14 and the shaft body 12 are lowered. In the present embodiment, the adhesive layer 16 is provide between the foamed elastic body layer 14 and the shaft body 12 as illustrated in FIGS. 1A and 1B, which can prevent the adhesive properties from being lowered. In this case, an adhesive agent having a functional group that reacts to water is preferably used as an adhesive material used with the adhesive layer 16. Since water is present abundantly in the emulsion compound, using an adhesive agent having a functional group that reacts to water promotes the reaction between the foamed elastic body layer 14 and the adhesive layer 16 to improve the adhesive properties between them, which can more prevent the adhesive properties between the foamed elastic body layer 14 and the shaft body 12 from being lowered. Examples of the adhesive agent having a functional group that reacts to water include an epoxy-based adhesive agent and a silane coupling-based adhesive agent.

In addition, when the silicone rubber is subjected to the low-temperature forming, the cross-linking rate (curing rate) of the foamed elastic body layer 14 is lowered. Using the above-described microcapsule type catalyst can prevent the cross-linking rate (curing rate) from being lowered. The resin of the resin microparticles is softened at temperatures lower than the forming temperature. For this reason, the Tg (glass transition point temperature) of the resin of the resin microparticles is preferably 120 degrees C. or less, more preferably 100 degrees C. or less, and still more preferably 80 degrees C. or less. In addition, because the resin of the resin Microparticles is solid at room temperature, the Tg is preferably room temperature (25 degrees C.) or more. In addition, the Tg of the resin of the resin microparticles is preferably 40 degrees C. or more and more preferably 50 degrees C. or more from the viewpoint that the cross-linking catalyst in the silicone rubber can be retained in the resin before curing to ensure storage stability.

In the forming step of (2), by coating the inner surface of the molding die (the surface on which the emulsion compound is casted) in advance with a chemical for forming a skin layer 14a before forming, a skin layer 14a of a given thickness can be formed in the foamed elastic body layer 14 on the outer peripheral side. Examples of the chemical include a surfactant with a high HLB value and a fluorine-containing control agent. The surfactant with a high HLB value has a higher HLB value than a surfactant used in forming the emulsion compound, and is aimed at not forming fine water bubbles but i breaking water bubbles. Because of the surfactant with a high HLB value, water bubbles can be prevented from being formed in the emulsion compound in the vicinity of the interface between the emulsion compound and the molding die, and thus a skin layer 14a is formed in the foamed elastic body layer 14 on the outer peripheral side. For this reason, the surfactant preferably has an HLB value of 7 or more and more preferably has an HLB value of 10 or more. Examples of the fluorine-containing control agent include a fluorine-containing silicone oil. These chemicals may be applied on the inner surface of the molding die together with a mold-releasing agent, or may be applied on the inner surface of the molding die instead of a mold-releasing agent. The fluorine-containing silicone oil, containing a silicone component, can penetrate into the emulsion compound containing silicone from the molding die surface on which the fluorine-containing silicone oil is applied. Then, the water bubbles can be moved inward from the outermost surface of the emulsion compound by the repulsive performance of the fluorine component to water bubbles.

With the formation of the skin layer 14a, the surfactant having a low HLB value that is already contained in the emulsion compound is present more in the inside of the foamed elastic body layer 14 while being present less in the skin layer 14a (outer peripheral side). To be specific, the content of the surfactant having a low HLB value varies between in the inside of the foamed elastic body layer 14 and in the skin layer 14a, and the content is larger in the inside of the foamed elastic body layer 14. When the surfactant having a low HLB value is thermally decomposed, the distribution of residues thereof indicates as described above. On the other hand, the surfactant having a high HLB value applied on the molding die is present less (or not present) in the inside of the foamed elastic body layer 14 while being present more in the skin layer 14a (outer peripheral side). When the surfactant having a high HLB value is thermally decomposed, the distribution of residues thereof indicates as described above.

The step of performing secondary curing of the silicone rubber may be used as the heating in the step of (3). Alternatively, another heat treatment may be carried out as the heating in the process of (3). Heating conditions are: a heating temperature of at least 100 degrees C. or more, preferably 150 degrees C. or more, and more preferably 200 degrees C. or more, and a heating time of at least one hour or more, preferably two hours or more. The secondary curing of the silicone rubber can further reduce the compression set of the formed product, reduce the amount of the low-molecular-weight siloxane component remaining in the silicone rubber, or remove the decomposed material of the organic peroxide. The conditions of the Secondary curing are: a temperature of preferably 200 degrees C. or more, and more preferably 200 to 250 degrees C., and a time of preferably 1 hour or more, and more preferably 1 to 10 hours at the predetermined temperature.

In the secondary curing of the silicone rubber, the surfactant already contained in the emulsion compound and the surfactant applied on the molding die are thermally decomposed, and the residues thereof remain in the cured silicone rubber, whereby the effect of plasticization or the like is produced to also contribute to reduction in hardness. On the other hand, it is also possible, in the secondary curing of the silicone rubber, to volatilize and remove the surfactant already contained in the emulsion compound and the surfactant applied on the molding die. For this purpose, low-boiling surfactants or surfactants of which a thermolysis product is low boiling are preferably used as the surfactants. Thus, low-molecular volatile components does not remain in the cured silicone rubber, which can prevent troubles (e.g., contamination) caused by exudation of the components when used as elastic rolls.

The shaft body 12 is not particularly limited. Shaft bodies having conductivity are preferable. Specific examples of the shaft bodies having conductivity include core metals of a solid body or a hollow body made from metals such as iron, stainless steel, and aluminum.

The thickness of the foamed elastic body layer 14 is, but not particularly limited, preferably within the range of 0.1 to 10 mm, and more preferably within the range of 1 to 5 mm. The elastic roll is not limited particularly to a conductive roll or a non-conductive roll; however, when the elastic roll is used as a conductive roll, the volume resistivity of the foamed elastic body layer 14 (at the time of applying 100 V thereon) is preferably within the range of $1\times10^2$ to $1\times10^8$ Ω·cm, more preferably within the range of $1\times10^3$ to $1\times10^7$ Ω·cm, and still more preferably within the range of $1\times10^3$ to $1\times10^6$ Ω·m. From the viewpoint of excellent fatigue resistance, the compression set of the foamed elastic body layer 14 is preferably 15% or less, more preferably 10% or less, and still more preferably 5% or less. From the viewpoint of a low hardness, the Asker C hardness of the foamed elastic body layer 14 is preferably 50 or less, more preferably 40 or less, and still more preferably 30 or less. The compression set of the foamed elastic body layer 14 is measured in accordance with the JIS K6262, and defines a compression set at 25% compression in a test of 70 degrees C×24 hours.

With the present elastic roll 10 having the above-described configuration, since the foamed elastic body layer 14 formed on the outer periphery of the shaft body 12 consists of the silicone rubber foamed body including the plurality of air bubbles 18 in its base material, containing the: cross-linked silicone rubber and the reinforcement material, and the silicone rubber foamed body has a communication degree of 40% or more, the foamed elastic body layer 14 can have a low hardness and can be made resistant to fatigue. In addition, since the skin layer 14a is provided in the foamed elastic body layer 14 on the outer peripheral side, property variations that are caused by the air bubbles 18 can be suppressed. In addition, since the shaft body 12 and the foamed elastic body layer 14 are bonded to each other via the adhesive agent having a functional group that reacts to water, reduction in adhesive properties between the shaft body 12 and the foamed elastic body layer 14 can be suppressed even when the foamed elastic body layer 14 consists of the silicone rubber foamed body having a communication degree of 40% or more.

The skin layer 14a may be also formed by controlling the cross-linking rate. For example, heat is transferred at the molding temperature from the molding die to the emulsion compound. Then, the mobility of the water bubbles increases in the emulsion compound gradually from the molding die interface toward the inside of the emulsion compound. The water bubbles with increased mobility move to the more stable inside of the emulsion compound. In a case where the cross-linking of the silicone rubber in the emulsion compound is adjusted to start after a predetermined period of time after casting, the water bubbles decrease in the vicinity of the molding die interface, and thus the skin layer 14a can be formed.

Since high temperature forming at 100 degrees C. or more is possible with the use of water containing a boiling point elevator, reduction in adhesive properties between the shaft body 12 and the foamed elastic foody layer 14 and reduction in the cross-linking rate (curing rate) of the foamed elastic body layer 14, which happen in performing low temperature forming, can be suppressed. In addition, the mobility of the water bubbles increases in the vicinity of the molding die interface because of high temperature forming, and thus the skin layer 14a can be formed more easily.

Figure 3:
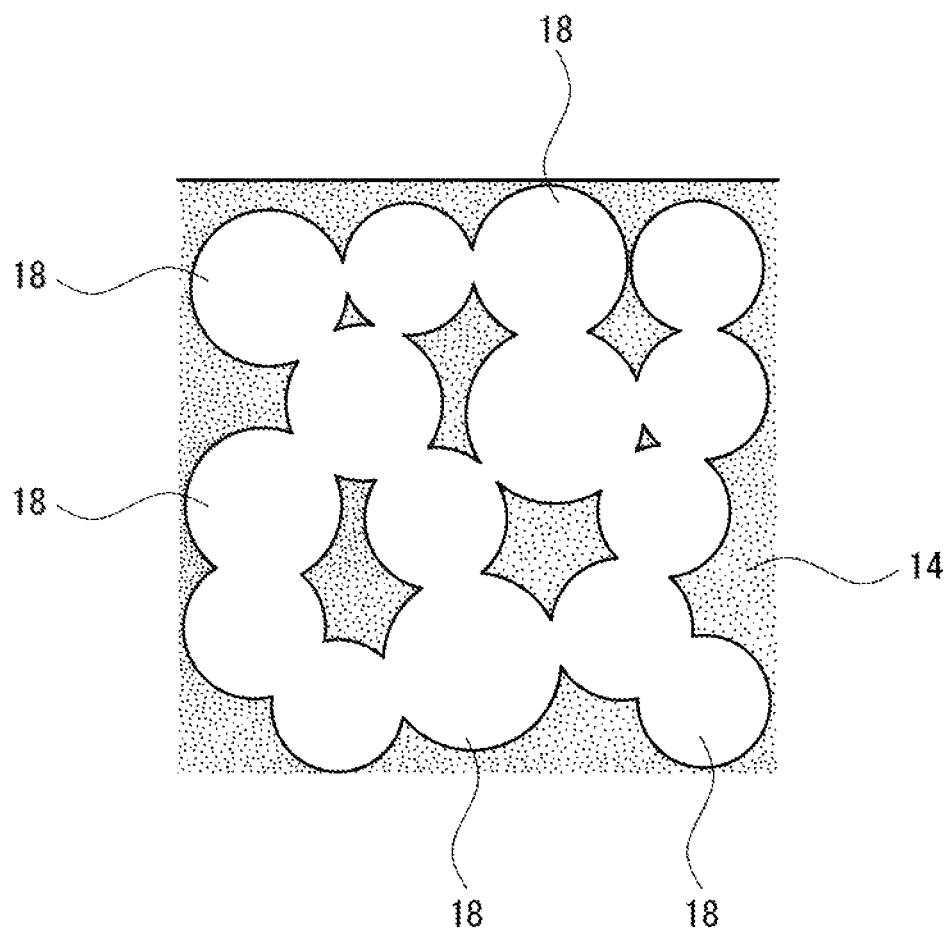
FIG. 3 is an enlarged cross-sectional view of a portion of a foamed elastic body layer according to another embodiment, the portion being close to the layer surface (enlarged view of B portion).

The present invention may include a configuration where no adhesive layer 16 is provided between the shaft body 12 and the foamed elastic body layer 14. In addition, the present invention may include a configuration where no skin layer 14a is provided in the foamed elastic body layer 14 on the outer peripheral side as illustrated in FIG. 3.

In the present invention, the elastic roll may be a conductive roll, a non-conductive roll, or a semi conductive roll. Examples of the conductive roll include a developing roll, a charging roll, and a toner supply roll in an electrophotographic apparatus. Examples of the non-conductive roll include a pressure roll, a fixing roll, and a paper feeding roll in an electrophotographic apparatus. In the present invention, the elastic roll may consist only of the shaft, body 12 and one layer of the foamed elastic body layer 14 as illustrated in FIGS. 1A and 1B, or the elastic roll may further include another layer than one layer of the foamed elastic body layer 14. Examples of the other layers include a surface layer and an intermediate layer. The surface layer defines a layer that appears on the surface of the elastic roll, and is provided in order to protect the roll surface or to impart surface properties. One or more intermediate layers are provided between the shaft body 12 and one layer of the foamed elastic body layer 14, or between one layer of the foamed elastic body layer 14 and the surface layer. The intermediate layer is provided in order to adjust the electrical resistance of the conductive roll, to improve adhesive properties of the conductive roll, or to prevent the components of the conductive roll from being diffused.

It is also possible that when no surface layer is provided as the other layer, the foamed elastic body layer 14 may be provided with the same function as the function imparted by a surface layer by subjecting the surface of the foamed elastic body layer 14 to a surface modification treatment for modifying the surface of the foamed elastic body layer 14. Examples of a surface modification method include methods for irradiating the surface with UV or electron beams, method for bringing the surface of the foamed elastic body layer 14 into contact with a surface modifier that is capable of reacting to unsaturated bonds or hydrosilation bonds that are intentionally left on the surface of the foamed elastic body layer 14, such as a compound containing reaction active groups such as an isocyanate group, a hydrosilyl group, an amino group, a halogen group, a thiol group, and a vinyl group.

Examples of the surface layer material include a urethane resin, a polyamide, an acrylic resin, an acrylic silicone resin, a butyral resin, an alkyd resin, a polyester resin, fluorine rubber, a fluorine resin, a silicone resin, an acryl modified silicone resin, a silicone-modified acrylic resin, a fluorine-modified acrylic resin, a melamine resin, methacrylic resins such as a polymethyl methacrylate (PMMA), polycarbonate, an epoxy resin, a phenolic resin, polybutylene terephthalate, polyacetal, a modified polyphenylene oxide (modified polyphenylene ether), a polyphenylene sulfide, polyether ether ketone, polyether sulfone, polysulfone, polyamideimide, polyetherimide, polyimide, polyarylate, polyallyl ether nitrile, nitrile rubber, and urethane rubber, and resins made by cross-linking the above-described resins. Ion conductive agents or electroconductive agents and a variety of additives may be added to the surface layer as necessary. The surface layer can be formed in a method for coating the outer periphery of foamed elastic body layer 14 or the intermediate layer with a composition for forming a surface layer. The surface layer may be subjected to a cross-linking treatment as necessary.

Examples of the intermediate layer material include hydrin rubber (CO, ECO, GCO, GECO), ethylene-propylene rubber (EPDM), styrene-butadiene rubber (SBR), polynorbornene rubber, silicone rubber, butadiene, rubber (BR), isoprene rubber (IR), acrylic rubber (ACM), chloroprene rubber (CR), urethane rubber, urethane-based elastomer, fluorine rubber, natural rubber (NR), acxylonitrile-butadiene rubber (NBR), and hydrogenated acrylonitrile-butadiene rubber (H-NBR). Ion conductive agents or electroconductive agents and a variety of additives may be added to the intermediate layer as necessary. The intermediate layer can be molded by forming a composition for forming an intermediate layer on the outer periphery of the foamed elastic body layer 14 or the like in an injection forming method, an extrusion forming method, or the like. The intermediate layer may be subjected to a cross-linking treatment as necessary.

EXAMPLE

Hereinafter, the present invention will be described in detail with reference to examples.

The used materials are as follows.

Silicone polymer <1>: "DMS-V41" manufactured by GELEST INC.

Silicone polymer <2>: "DMS-V35" manufactured by GELEST INC.

Silicone polymer <3>: "DMS-V31" manufactured by GELEST INC.

Silicone polymer <4>: "DMS-V21" manufactured by GELEST INC.

Cross-linking agent: hydrosilyl cross-linking agent ("HMS-151" manufactured by GELEST INC.)

Platinum catalyst: ("three % by mass IPA solution of platinum (IV) chloride hydrate" manufactured by FURUYA METAL CO., LTD.)

Retarder: 1-ethynyl-1-cyclohexanol

Reinforcement material: dry silica ("AEROSIL RX200" manufactured by NIPPON AEROSIL CO., LTD.)

Electroconductive agent <1>: carbon black ("DENKA BLACK" manufactured by DENKA COMPANY LIMITED)

Surfactant <1>: ether-modified polydimethylsiloxane, HLB=5, ("KF-6015" manufactured by SHIN-ETSU CHEMICAL CO., LTD.)

Surfactant <2>: ether-modified polydimethylsiloxane, HLB=12, ("KF-6011" manufactured by SHIN-ETSU CHEMICAL CO., LTD.)

Surfactant <3>: ether-modified polydimethylsiloxane, HLB=7, ("KF-6012" manufactured by SHIN-ETSU CHEMICAL CO., LTD.)

Thermoplastic polyurethane: ("NIPPOLAN 5196" manufactured by TOSOH CORPORATION)

Bifunctional polypropylene glycol: polyether diol ("ADEKA POLYETHER P-1000" manufactured by ADEKA CORPORATION)

Polyisocyanate ("CORONATE HX" manufactured by TOSOH CORPORATION)

Electroconductive agent <2>: carbon black ("KETJEN EC300J" manufactured by LION SPECIALTY CHEMICALS CO., LTD.)

(Preparation of Emulsion Compounds)

Each of silicone rubber compounds was obtained by mixing to stir 100 parts by mass of the silicone polymer, 2 parts by mass of the cross-linking agent, 0.05 parts by mass of the platinum catalyst, 0.05 parts by mass of the retarder, and the reinforcement material (parts by mass). Five parts by mass of the surfactant <1> was mixed to be: dispersed into each of the resulting silicone rubber compounds, and then 100 parts by mass of distilled water was further mixed thereto and stirred, whereby each of emulsion compounds was obtained. The viscosities of the emulsion compounds were measured with the use of "AR500 RHEOMETER" manufactured by TA INSTRUMENTS JAPAN INC., using a cone of two centimeters two degrees in the geometry in an equilibrium flow mode, under the conditions of a gap distance of 50 to 55 µm at a temperature of 25 degrees C.

(Preparation of Silicone Rubber Foamed Bodies)

Each of the resulting emulsion compounds was casted into a molding die that was temperature-modulated at a forming temperature (90 degrees C.) to be kept for 45 minutes while the forming temperature was maintained to cure the silicone rubber, and thus silicone rubber cured products were obtained. Then, each of the silicone rubber cured products was removed from the molding die to be kept in a constant-temperature bath of 200 degrees C. for four hours, and the water present in each of the silicone rubber cured products was volatilized and removed, and thus silicone rubber foamed bodies were obtained.

(Strength)

The silicone rubber foamed bodies in which the silicone rubber was found torn when the silicone rubber cured products were removed. from the molding dies after the formation were rated "inferior". The silicone rubber foamed bodies in which the silicone rubber was found untorn when the silicone rubber cured products were removed from the molding dies after the formation were rated "excellent".

The communicating degrees and compression seta of the resulting silicone rubber foamed bodies were measured. Methods for measuring communicating degrees and compression sets are as follows. The results are shown in Table 1.

(Method for Measuring Communication Degrees)

Test pieces were prepared by cutting the entire surfaces of the resulting silicone rubber foamed bodies by one mm or more. Then, a test solution was prepared by adding 3 parts by mass of ether-modified silicone oil ("KF-618" manufactured by SHIN-ETSU CHEMICAL CO., LTD.) to 100 parts by mass of distilled water. Then, specific gravity a of an unfoamed body that was prepared separately, specific gravities b of the test pieces, the masses c of the test pieces were each measured. Then, the test pieces were submerged into a container containing the test solution to be fixed to the bottom of the container so as not to float, then left under reduced pressure (70 mmHg or less) for 10 minutes, and thus the test solution was stimulated to penetrate into the test pieces. Then, returned to atmospheric pressure, the test pieces were taken out of the test solution, and the water adhering to the test pieces was wiped off, and then the masses d of the test pieces absorbing water were measured. The water absorption rates of the test pieces were found using the following equation (1), and the communication. rates were found using the following equation (2).

(Equation 1)

Water absorption rate (%)={(mass $d$ of a test piece after absorbing water–mass $c$ of the test piece before absorbing water)/(mass $c$ of the test piece before absorbing water)}×100   (1)

(Equation 2)

Communicating rate (%)=(specific gravity $b$ of a test piece×water absorption rate/100/{specific gravity of a test solution–(specific gravity $b$ of the test piece/specific gravity $a$ of an unfoamed body)}×100   (2)

(Method for Measuring Compression Sets)

Cylindrical shaped formed bodies having a diameter of 29.0±0.5 mm and a thickness of 12.5±0.5 mm were prepared as test pieces. Compression tests at 70 degrees C.×24 hours×25% were carried out in accordance with "Rubber, vulcanized or thermoplastic—Determination of compression set at ambient or elevated temperatures" specified in the JIS K-6262. At this time, the test pieces having compression set values of 5% or less were regarded to have an excellent fatigue resistance, and rated "very good". The test pieces having compression set values of 10% or less were regarded to have a favorable fatigue resistance, and rated "good". The test pieces having compression set values of more than 10% were regarded to have an unfavorable fatigue resistance, and rated, "poor".

(Measurement of Average Diameter of Air Bubbles)

Pictures of the cross-sections of the obtained silicone foamed bodies were taken with the use of a laser microscope, and the diameters of 90% of the air bubbles showing up in the photographing ranges of 200 µm per side at given three positions were measured to calculate the average of the measured diameters. In addition, variations in size of the air bubbles were found at the same time. The variations in size of the air bubbles were found by calculating in ± what % of the average size, 90% of the air bubbles showing up in the photographing ranges of 200 µm per side were included.

polymers, 2 parts by mass of the cross-linking agent, 0.05 parts by mass of the platinum catalyst, 0.05 parts by mass of the retarder, the reinforcement material (parts by mass), and the electro-conductive agent (parts by mass). Five parts by mass of the surfactant <1> was mixed to be dispersed into each of the resulting silicone rubber compounds, and then 100 parts by mass of distilled water was further mixed thereto and stirred, whereby each of emulsion compounds was obtained (Table 2).

(Preparation of Elastic Rolls)

Iron bars that are solid, of a cylindrical shape, and six mm in diameter were prepared as shaft bodies, and an adhesive agent was applied on the outer peripheries of the iron bars. The shaft foodies were placed in hollow space of roll molding dies, then the emulsion compounds having the compositions according to Table 2 were each casted into the hollow space to be heated at 90 degrees C. for 45 minutes to be cured, and then were removed from the molding dies. Then, the emulsion compounds were heated at 200 degrees C. for 4 hours to remove the water in the rubber, whereby roll-shaped foamed elastic body layers (3 mm in thickness) made of foamed silicone rubber were formed on the outer

TABLE 1

|  | Examples | | | Comparative Examples | | |
| --- | --- | --- | --- | --- | --- | --- |
|  | 1 | 2 | 3 | 1 | 2 | 3 |
| Silicone polymer <1> | 100 | 100 | 100 | 100 | 100 | 100 |
| Platinum catalyst | 0.05 | 0.05 | 0.05 | 0.05 | 0.05 | 0.05 |
| Retarder | 0.05 | 0.05 | 0.05 | 0.05 | 0.05 | 0.05 |
| Cross-linking agent | 2 | 2 | 2 | 2 | 2 | 2 |
| Reinforcement material (fumed silica) | 0.5 | 5 | 15 | 0 | 20 | 30 |
| Surfactant <1> | 5 | 5 | 5 | 5 | 5 | 5 |
| Distilled water | 100 | 100 | 100 | 100 | 100 | 100 |
| Viscosity [Pa · s] | 50 | 300 | 1000 | 10 | 1500 | 2500 |
| Skin layer | Not provided | Not provided | Not provided | Not provided | Not provided | Not provided |
| Average diameter of air bubbles (µm) | 10 | 10 | 10 | 50 | 10 | 10 |
| Variations in size of air bubbles (%) | ±5 | ±5 | ±5 | ±25 | ±5 | ±5 |
| Communication degree (%) | 85 | 88 | 40 | 80 | 22 | 5 |
| Compression set (%) | 4 | 4 | 7 | 5 | 11 | 23 |
| Evaluation | Very good | Very good | Good | Very good | Poor | Poor |
| Strength(tearing) | Excellent | Excellent | Excellent | Inferior | Excellent | Excellent |

It is found from Table 1 that the silicone rubber foamed bodies having communication degrees of less than 40% have compression sets of more than 10%, and thus are inferior in fatigue resistance. On the other hand, it is found that the silicone rubber foamed bodies having communication degrees of 40% or more have compression sets of 10% or less, and thus are excellent in fatigue resistance. In addition, it is found that the silicone rubber foamed bodies having communication degrees of 80% or more have compression sets of 5% or less, and thus are especially excellent in fatigue resistance. It is found that when the contents Of the reinforcement materials are 15 parts by mass or less with respect to 100 parts by mass of the cross-linked silicone rubber, the silicone rubber foamed bodies can be made to have communication degrees of 40% or more to accordingly have compression sets of 10% or less, and thus are excellent in fatigue resistance. It is also found that the silicone rubber foamed body containing no reinforcement material cannot satisfy the strength.

Next, elastic rolls that were made of emulsion compounds and were not provided with a skin layer were prepared, and subjected to image evaluation. The obtained results are shown in Table 2.

(Preparation of Emulsion Compounds)

Each of silicone rubber compounds was obtained by mixing to stir 100 parts by mass of one of the silicone peripheries of the shaft bodies. Elastic (conductive) rolls were prepared in this manner.

(Strength)

The emulsion compounds in which the rubber was found torn when the emulsion compounds were removed from the molding dies after the formation were ratted "inferior". The emulsion compounds in which the rubber was found untorn when the emulsion compounds were removed from the molding dies after the formation were rated "excellent".

(Image Evaluation)

Each of the obtained elastic (conductive) rolls was installed as a tonner supply roll into a commercially available color laser printer ("COLOR LASER JET PRO 400 COLOR M451DN" manufactured by HEWLETT-PACKARD JAPAN, LTD.), and then a solid printed image output was carried out under an environment of 25 degrees C. and 50% RH. The densities at 15 sites on each of the solid printed images were measured with the use of a Macbeth densitometer, and image evaluation was carried out based on the density irregularities (differences) among the sites. The rolls by which the solid printed images had not more than two density irregularities (differences) were rated "very good", the rolls by which the solid printed images had not more than three density irregularities (differences) were rated "good", the rolls by which the solid printed images had more than three to not more than four density irregularities (differences) were rated "average", and the rolls by which the solid printed images had more than four density irregularities (differences) were rated "poor".

emulsion compounds in which the rubber was found untorn when the emulsion compounds were removed from the molding dies after the formation were rated "excellent".

TABLE 2

|  | Examples | | | | |
| --- | --- | --- | --- | --- | --- |
|  | 4 | 5 | 6 | 7 | 8 |
| Silicone polymer <1> | 100 | 100 | | | |
| Silicone polymer <2> | | | 100 | | |
| Silicone polymer <3> | | | | 100 | |
| Silicone polymer <4> | | | | | 100 |
| Platinum catalyst | 0.05 | 0.05 | 0.05 | 0.05 | 0.05 |
| Retarder | 0.05 | 0.05 | 0.05 | 0.05 | 0.05 |
| Cross-linking agent | 2 | 2 | 2 | 2 | 2 |
| Reinforcement material (fumed silica) | 5 | 0 | 0 | 0 | 0 |
| Electroconductive agent <1> | 6 | 6 | 6 | 6 | 6 |
| Surfactantt <1> | 5 | 5 | 5 | 5 | 5 |
| Distilled water | 100 | 100 | 100 | 100 | 100 |
| Viscosity [Pa · s] | 300 | 10 | 5 | 1 | 0.1 |
| Skin layer | Not provided | Not provided | Not provided | Not provided | Not provided |
| Average diameter of air bubbles (μm) | 10 | 50 | 80 | 100 | 200 |
| Variations in size of air bubbles (%) | ±5 | ±25 | ±40 | ±50 | ±100 |
| Communication degree (%) | 68 | 80 | 80 | 80 | 80 |
| Compression set (%) | 4 | 5 | 5 | 6 | 6 |
| Evaluation | Very good | Very good | Very good | Good | Good |
| Strength (tearing) | Excellent | Excellent | Excellent | Excellent | Excellent |
| Image evaluation | Very good | Very good | Good | Poor | Poor |

It is found from table 2 that when the air bubbles had the average diameter of 100 μm or more, variations in diameter of the air bubbles were large to increase the property variations (variations in hardness and compression set) which were caused by the air bubbles, and thus the density irregularities of the images were great. On the other hand, it is found that when the air bubbles had the average diameter of less than 100 μm, variations in diameter of the air bubbles were small, and thus the density irregularities of the images were small. In addition, it is found that when the air bubbles had the average diameter of 50 μm or less, variations in diameter of the air bubbles were very small, and thus the density irregularities of the images were small.

Next, elastic rolls made of emulsion compounds that were provided with a skin layer were prepared, and subjected to image evaluation. The obtained results are shown in Table 3.

(Preparation of Elastic Rolls Provided With a Skin Layer)

The surfactant <2> was applied in advance on the inner surfaces of the hollow space of the roll molding dies. Iron bars that are solid, of a cylindrical shape, and six mm in diameter were prepared as shaft bodies, and an adhesive agent was applied on the outer peripheries of the iron bars. The shaft bodies were placed in hollow space of the roll molding dies, then the above-described emulsion compounds were each casted into the hollow space to be heated at 90 degrees C. for 45 minutes to be cured, and then were removed from the molding dies. Then, the emulsion compounds were heated at 200 degrees C. for 4 hours to remove the water in the rubber, whereby roll-shaped foamed elastic body layers (3 mm in thickness) made of foamed silicone rubber were formed on the outer peripheries of the shaft bodies. Elastic (conductive) rolls provided with a skin layer were prepared in this manner.

(Strength)

The emulsion compounds in which the rubber was found torn when the emulsion compounds were removed from the molding dies after the formation were rated "inferior". The (Preparation of Surface Layer Composition)

10 parts by mass of the thermoplastic polyurethane, 50 parts by mass of the polyether diol, 30 parts by mass of the polyisocyanate, and 3 parts by mass of the electronic conductive agent <2> were dissolved in MEK so as to have a concentration of 20% by mass, and the resulting mixture was sufficiently mixed to be dispersed with the use of three rolls. A surface layer composition was prepared in this manner.

(Preparation of Two-Layer Elastic Rolls Provided With a Surface Layer)

The surface layer composition prepared as above was applied on the outer periphery of each of the foamed elastic body layers in a roll coating method, and then heated to be cured at 120 degrees C. for 60 minutes, whereby surface layers (10 μm in thickness) were formed. Two-layer elastic (conductive) rolls provided with a surface layer were prepared in this manner.

(Thickness of Skin Layers)

The outer peripheral sides in radial cross section of the foamed elastic body layers were observed under of a laser microscope, and the thicknesses of the portions where air bubbles are included less than the insides of the foamed elastic body layers were measured to find the thicknesses of the skin layers.

(Image Evaluation)

Each of the two-layer elastic (conductive) rolls provided with the above-described surface layers was installed as a developing roll into a commercially available color laser printer ("COLOR LASER JET PRO 400 COLOR M451DN" manufactured by HEWLETT-PACKARD JAPAN, LTD.), and then a solid printed image output was carried out under an environment of 25 degrees C. and 50% RH. The densities at 15 sites on each of the solid printed images were measured with the use of a Macbeth densitometer, and image evaluation was carried out based on the density irregularities (differences) among the sites. The rolls by which the solid printed images had not more than two density irregularities (differences) were rated "very good", the rolls by which the solid printed images had not more than three density irregularities (differences) were rated "good", the rolls by which the solid printed images had more than three to not more than four density irregularities (differences) were rated "average", and the rolls by which the solid printed images had more than four density irregularities (differences) were rated "poor".

Next, we examined conditions that are effective for the skin layers exhibiting the above-described effects. To be specific, the air bubble content ratio of each foamed elastic body layer in its inside and the air bubble content ratio of each foamed elastic body layer on its outer peripheral side (in the region up to a half of the average diameter of the air

TABLE 3

|  | Examples | | | | | | |
| --- | --- | --- | --- | --- | --- | --- | --- |
|  | 4 | 8 | 10 | 11 | 12 | 13 | 14 |
| Silicone polymer <1> | 100 | 100 | 100 | 100 | 100 | | |
| Silicone polymer <3> | | | | | | 100 | 100 |
| Platinum catalyst | 0.05 | 0.05 | 0.05 | 0.05 | 0.05 | 0.05 | 0.05 |
| Retarder | 0.05 | 0.05 | 0.05 | 0.05 | 0.05 | 0.05 | 0.05 |
| Cross-linking agent | 2 | 2 | 2 | 2 | 2 | 2 | 2 |
| Reinforcement material (fumed silica) | 5 | 5 | 5 | 0 | 0 | 0 | 0 |
| Electroconductive agent <1> | 6 | 6 | 6 | 6 | 6 | 6 | 6 |
| Surfactant <1> | 5 | 5 | 5 | 5 | 5 | 5 | 5 |
| Distilled water | 100 | 100 | 100 | 100 | 100 | 100 | 100 |
| Viscosity [Pa · s] | 300 | 300 | 300 | 10 | 10 | 1 | 1 |
| Coating on molding die (μm) | 0 | 1 | 3 | 3 | 6 | 3 | 10 |
| Skin layer (μm): a | 0 | 2 | 5 | 5 | 25 | 5 | 50 |
| Average diameter of air bubbles (μm): b | 10 | 10 | 10 | 50 | 50 | 100 | 100 |
| a/b | 0 | 1/5 | 1/2 | 1/10 | 1/2 | 1/20 | 1/2 |
| Variations in size of air bubbles (%) | ±5 | ±5 | ±5 | ±25 | ±25 | ±50 | ±50 |
| Communication degree (%) | 88 | 88 | 88 | 80 | 80 | 80 | 80 |
| Compression set (%) | 4 | 4 | 4 | 5 | 5 | 6 | 6 |
| Evaluation | Very good | Very good | Very good | Very good | Very good | Good | Good |
| Strength (tearing) | Excellent | Excellent | Excellent | Excellent | Excellent | Excellent | Excellent |
| Image evaluation | Average | Good | Very good | Good | Very good | Good | Very good |

It is found from Table 3 that even when the air bubbles had the average diameter of 100 μm, including the skin layers allowed small density irregularities of the image. It is found that the skin layers could suppress property variations (variations in hardness and compression set) that were caused by the air bubbles. In addition, it is found that when the thicknesses of the skin layers were not less than a third of the average diameter of the air bubbles, a very high effect on suppressing property variations can be obtained, and thus the density irregularities of the image were very small.

bubbles from the surface) were compared to find the ratio of the air bubble content ratio of each foamed elastic body layer on its outer peripheral side to the air bubble content ratio of each foamed elastic body layer in its inside. Preparation of two-layer elastic rolls provided with a surface layer was carried out in the above-described method for preparing "two-layer elastic rolls provided with a surface layer", The obtained results are shown in Table 4.

TABLE 4

|  | Examples | | | | |
| --- | --- | --- | --- | --- | --- |
|  | 15 | 16 | 17 | 18 | 19 |
| Silicone polymer <1> | 100 | 100 | 100 | 100 | 100 |
| Platinum catalyst | 0.05 | 0.05 | 0.05 | 0.05 | 0.05 |
| Retarder | 0.05 | 0.05 | 0.05 | 0.05 | 0.05 |
| Cross-linking agent | 2 | 2 | 2 | 2 | 2 |
| Reinforcement material (fumed silica) | 5 | 5 | 5 | 5 | 5 |
| Electroconductive agent <1> | 6 | 6 | 6 | 6 | 6 |
| Surfactant <1> | 5 | 5 | 5 | 5 | 5 |
| Distilled water | 100 | 100 | 100 | 50 | 50 |
| Viscosity [Pa · s] | 300 | 300 | 300 | 300 | 300 |
| Surface acting agent for molding die | <1> | <3> | <2> | <3> | <2> |
| Skin layer (μm):a | 5 | 5 | 5 | 5 | 5 |
| Average diameter of air bubbles (μm):b | 10 | 10 | 10 | 10 | 10 |
| a/b | 1/2 | 1/2 | 1/2 | 1/2 | 1/2 |
| Air bubble content ratio (%) Inside:c | 50 | 50 | 50 | 30 | 30 |
| Air bubble content ratio (%) Skin layer:d | 50 | 20 | 10 | 10 | 6 |
| d/c (%) | 100% | 40% | 20% | 33% | 20% |
| Variations in size of air bubbles (%) | ±5 | ±5 | ±5 | ±5 | ±5 |
| Communication degree (%) | 88 | 88 | 88 | 88 | 88 |
| Compression set (%) | 4 | 4 | 4 | 4 | 4 |
| Evaluation | Very good | Very good | Very good | Very good | Very good |
| Strength (tearing) | Excellent | Excellent | Excellent | Excellent | Excellent |
| Image evaluation | Average | Good | Very good | Good | Very good |

It is found from Table 4 that when the ratios of the air bubble content ratios of the foamed elastic body layers on their outer peripheral sides to the air bubble content ratios of the foamed elastic body layers in their insides were 40% or less, density irregularities of the images were small. Thus, it is found from the high effect of suppressing property variations (variations in hardness and compression set) that were caused by the air bubbles, the ratios of the air bubble content ratios of the foamed elastic body layers on their outer peripheral sides to the air bubble content ratios of the foamed elastic body layers in their insides were preferably made to be 40% or less as conditions that were effective for the skin layers. In addition, it is found that when the ratios were 30% or less, the density irregularities of the images were very small.

Next, in preparing the elastic rolls, evaluation of the adhesive properties that vary with the type of adhesive agents was carried out. The obtained results are shown in Table 5. The elastic rolls were prepared in the same manner as in Example 4.

(Adhesive Agents)

Acrylic-based adhesive agent: "METALOC S-5" manufactured by TOYOKAGAKU KENKYUSHO CO., LTD.

Epoxy-based adhesive agent: "ARON MIGHTY AS-60" manufactured by TOAGOSEI CO., LTD.

Silane coupling agent-based adhesive agent: "PRIMER-NO. 4" manufactured by SHIN-ETSU CHEMICAL CO., LTD.

(Evaluation of Adhesive Properties)

The adhesive agents with the use of which the foamed elastic body layers came off the shaft bodies at the time of removing the rolls from the molding dies after formation of the rolls, and no foamed elastic body layer remained on the shaft bodies were rated "very poor", meaning the adhesive agents have very poor adhesive properties. The adhesive agents with the use of which some foamed elastic body layers came off the shaft bodies at the time of removing the rolls from the molding dies after formation of the rolls, but the foamed elastic body layers remained on the shaft bodies were rated "poor", meaning the adhesive agents have slightly poor adhesive properties. The adhesive agents with the use of which the foamed elastic body layers did not come off the shaft bodies at the time of removing the rolls from the molding dies after formation of the rolls, and the foamed elastic body layers remained on the shaft bodies were rated "good", meaning the adhesive agents have good adhesive properties.

TABLE 5

| Type of adhesive agents | Acrylic-based adhesive agent | Epoxy-based adhesive agent | Silane coupling agent-based adhesive agent |
|---|---|---|---|
| Adhesive properties | Poor | Good | Good |

It is found from Table 5 that when the epoxy-based adhesive agent or the silane coupling agent-based adhesive agent was used as the adhesive agent, the water contained in the emulsion compounds promoted the adhesive reactivity, which allowed good adhesive properties even at the time of low-temperature forming.

Next, microcapsule type catalysts were prepared, and the cross-linking rates and storage stabilities of emulsion compounds containing the microcapsule type catalysts were evaluated. The details of the prepared microcapsule type catalysts are shown in Table 6, the evaluation results are shown in Table 7.

[Preparation of Microcapsule Type Catalysts]

A toluene solution of a platinum catalyst (a toluene solution containing three % by mass of a platinum catalyst as platinum metal atoms), each of coating resins used for microparticulation, and toluene were mixed at a ratio (mass ratio) of 0.6:5:95. Then, each of the resulting solutions was dropped into a water solution of a surfactant to produce emulsions. Then, after reducing the pressure to remove the toluene from the emulsions, microparticles of each type containing each coating resin and the platinum catalyst were obtained by filtering each emulsion.

The materials used in the preparation of the microcapsule type catalysts are as follows.

Platinum catalyst: chloroplatinic acid (IV) manufactured by FURUYA METAL CO., LTD.

(Coating Resins)

Polyvinyl butyral (PVB): "MOWITAL B30HH" manufactured by KURARAY CO., LTD.

Acrylic resin (PMMA): "ACRYPET MF" manufactured by MITSUBISHI RAYON CO., LTD.

Acrylic resin (an ethyl methacrylate-methyl methacrylate copolymer, EMA): "HI-PEARL M-4501" manufactured by NEGAMI CHEMICAL INDUSTRIAL CO., LTD.

Styrene-based polymer (a styrene-butadiene copolymer, SBS): K-RESIN (KR03) manufactured by DAELIM INDUSTRIAL CO., LTD.

Epoxy resin (a dicyclopentadiene type epoxy resin): "HP7200H" manufactured by DIC Silicone resin (a methyl silicone resin, methyl Q): "YR3370" manufactured by MOMENTIVE PERFORMANCE MATERIALS INC.

Hydrogenated terpene resin: "CLEARON P150" manufactured by YASUHARA CHEMICAL CO., LTD.

Surfactant: "TRITON X-100" manufactured by WAKO PURE CHEMICAL INDUSTRIES, LTD.

The solubility parameters (SP values) and the glass-transition temperatures (Tg) of the coating resins of the microcapsule type catalysts were measured in the following method.

(Solubility Parameters (SP Values))

The SP values were estimated based on the molecular structures by using the calculating method of small.

Equation: $\delta = \rho \Sigma Fi/M$ ($\delta$: a compatibility parameter, [$\rho$: a resin specific gravity, M: a molecular mass of a resin structural unit, Fi: a molar suction constant)

(Glass-Transition Temperatures (Tg))

The temperatures at the endothermic peaks indicating the glass transition points of the resins were measured by a DSC (differential scanning calorimetry) measurement. The DSC measurements were carried out under a nitrogen gas atmosphere at the rate of temperature increase of 20 degrees C./min.

TABLE 6

| | Coating resins | | |
|---|---|---|---|
| | Type | SP value ($\delta$) | Tg (° C.) |
| Microcapsule type catalyst <1> | Polyvinyl butyral resin (PVB) | 8.8 | 59 |
| Microcapsule type catalyst <2> | Acrylic resin (PMMA) | 9.3 | 96 |
| Microcapsule type catalyst <3> | Acrylic resin (EMA) | 9.6 | 84 |
| Microcapsule type catalyst <4> | Styrene-based polymer (SBS) | 8.9 | 85 |

TABLE 6-continued

|  | Coating resins | | |
| --- | --- | --- | --- |
|  | Type | SP value (δ) | Tg (° C.) |
| Microcapsule type catalyst <5> | Epoxy resin | 8.7 | 41 |
| Microcapsule type catalyst <6> | Silicone resin (methyl Q) | 7.9 | 77 |
| Microcapsule type catalyst <7> | Hydrogenated terpene resin | 7.6 | 150 |

Example 20

(Preparation of Emulsion Compound)
An emulsion compound according to Example 20 was prepared in the same manner as in Example 2 except that the content of the retarder was changed from 0.05 parts by mass to 0.02 parts by mass.
(Preparation of Silicone Rubber Foamed Body)
A silicone rubber foamed body according to Example 20 was prepared in the same manner as in Example 2 except that the emulsion compound according to Example 20 was used.

Examples 21 to 27

(Preparation of Emulsion Compounds)
Emulsion compounds according to Examples 21 to 27 were prepared in the same manner as in Example 20 except that the platinum catalyst was replaced with the prepared microcapsule type catalysts. At this time, the contents of the platinum catalysts in the microcapsule type catalysts were made the same: as that of Example 20.
(Preparation of Silicone Rubber Foamed Bodies)
Silicone rubber foamed bodies according to Examples 21 to 27 were prepared in the same manner as in Example 2 except that the emulsion compounds according to Examples 21 to 27 were used.

The properties (the strengths, the communicating degrees, the compression sets, and the diameters of the air bubbles) of the prepared silicone rubber foamed foodies were measured and evaluated in the same manner as in Example 2.
(Cross-Linking Rates)
The cross-linking rates of the emulsion compounds were evaluated based on the curing rates at 90 degrees C. The times it took for the torques of a rheometer to reach the maximum of 90% were measured as cross-linking times. The emulsion compounds of which the cross-linking times were 1 minute or less were rated "excellent", the emulsion compounds of which the cross-linking times were more than 1 minute to less than 10 minutes were rated "slightly inferior", and the emulsion compounds of which the cross-linking times were 10 minutes or more were rated "inferior".
(Storage Stability)
After preparing the emulsion compounds, the viscosities of the emulsion compounds after having been left at normal temperature and normal humidity for one week were measured (viscometer: TVB-10 viscometer manufactured by TOKI SANGYO CO., LTD.). The emulsion compounds that had a viscosity increase rate of 50% or less were rated "good, the emulsion compounds that had a viscosity increase rate of 30% or less were rated "very good", and the emulsion compounds that had a viscosity increase rate of more than 50% were rated "slightly inferior".

TABLE 7

|  | Examples | | | | | | | |
| --- | --- | --- | --- | --- | --- | --- | --- | --- |
|  | 20 | 21 | 22 | 23 | 24 | 25 | 26 | 27 |
| Silicone polymer <1> | 100 | 100 | 100 | 100 | 100 | 100 | 100 | 100 |
| Platinum catalyst | 0.05 | — | — | — | — | — | — | — |
| Microcapsule type catalyst <1> | — | 0.4 | — | — | — | — | — | — |
| Microcapsule type catalyst <2> | — | — | 0.4 | — | — | — | — | — |
| Microcapsule type catalyst <3> | — | — | — | 0.4 | — | — | — | — |
| Microcapsule type catalyst <4> | — | — | — | — | 0.4 | — | — | — |
| Microcapsule type catalyst <5> | — | — | — | — | — | 0.4 | — | — |
| Microcapsule type catalyst <6> | — | — | — | — | — | — | 0.4 | — |
| Microcapsule type catalyst <7> | — | — | — | — | — | — | — | 0.4 |
| Retarder | 0.02 | 0.02 | 0.02 | 0.02 | 0.02 | 0.02 | 0.02 | 0.02 |
| Cross-linking agent | 2 | 2 | 2 | 2 | 2 | 2 | 2 | 2 |
| Reinforcement material (fumed silica) | 5 | 5 | 5 | 5 | 5 | 5 | 5 | 5 |
| Surfactant <1> | 5 | 5 | 5 | 5 | 5 | 5 | 5 | 5 |
| Distilled water | 100 | 100 | 100 | 100 | 100 | 100 | 100 | 100 |
| Viscosity [Pa · s] | 300 | 300 | 300 | 300 | 300 | 300 | 300 | 300 |
| Skin layer (μm) | Not provided | Not provided | Not provided | Not provided | Not provided | Not provided | Not provided | Not provided |
| Average diameter of air bubbles (μm) | 10 | 10 | 10 | 10 | 10 | 10 | 10 | 10 |
| Variations in size of air bubbles (%) | ±5 | ±5 | ±5 | ±5 | ±5 | ±5 | ±5 | ±5 |
| Communication degree (%) | 88 | 88 | 88 | 88 | 88 | 88 | 88 | 88 |
| Compression set (%) | 4 | 4 | 4 | 4 | 4 | 4 | 4 | 4 |
| Evaluation | Very good | Very good | Very good | Very good | Very good | Very good | Very good | Very good |
| Strength (tearing) | Excellent | Excellent | Excellent | Excellent | Excellent | Excellent | Excellent | Excellent |
| Cross-linking rate | Excellent | Excellent | Excellent | Excellent | Excellent | Excellent | Excellent | Excellent |
| Storage stability | Slightly inferior | Very good | Very good | Very good | Very good | Very good | Good | Slightly inferior |

It is found that the silicone rubber foamed bodies according to Examples 20 to 27 were, even when containing the microcapsule type catalysts instead of the platinum catalyst, equivalent to those containing the platinum catalyst. The silicone rubber foamed body according to Example 20 contained the smaller amount of the retarder in the. emulsion, compound than that of Example 2. For this reason, the silicone rubber foamed body according to Example 20 was inferior in storage stability while being excellent in cross-linking rate at low temperature (90 degrees C.). In contrast, it is found that the silicone rubber foamed bodies according to Examples 21 to 27 could have storage stability that was improved while maintaining the cross-linking rates at low temperature (90 degrees C.) by containing the microcapsule type catalysts instead of the platinum catalyst. In addition, it is found that when the resins of the microcapsule type catalysts had the SP values of 7.9 or more, the silicone rubber foamed bodies could have storage stability that was improved while maintaining the cross-linking rates at low temperature (90 degrees C.). It is considered that because the resins of the microcapsule type catalysts had the SP values that greatly deviated from the SP values of the silicone polymers that were the base polymers of the emulsion compounds, the resins of the resin microparticles had lowered compatibility with the silicone polymers, which could prevent the resins of the microcapsule type catalysts from dissolving or swelling during storage, whereby the sustained release properties of the cross-linking catalysts (platinum catalysts) that were encapsulated by the resins could be diminished. It is to be noted that in the silicone rubber foamed bodies according to Examples 20 and 27, after the microcapsule type catalysts were mixed with the mixtures of the silicone polymers and cross-linking agents, curing of the mixtures progressed immediately.

Having thus described in detail embodiments and examples of the present invention, the present invention is not intended to be limited to the above embodiments and examples, and various modifications are possible without departing from the scope of the present invention.

The invention claimed is:

1. An elastic roll for an electrophotographic apparatus, the roll comprising a shaft body, and a foamed elastic body layer provided on an outer periphery of the shaft body,
   wherein the foamed elastic body layer consists of a silicone rubber foamed body comprising a plurality of air bubbles in its base material comprising cross-linked silicone rubber and a reinforcement material,
   wherein the foamed elastic body layer has a communication degree of 40% or more, and
   wherein the base material comprises a cross-linked product of a silicone rubber composition that comprises an organopolysiloxane, a cross-linking agent, a reinforcement material, and a microcapsule type catalyst consisting of resin microparticles encapsulating a cross-linking catalyst.

2. The elastic roll for an electrophotographic apparatus according to claim 1, wherein the resin of the resin microparticles has a solubility parameter of 7.9 or more.

3. The elastic roll for as electrophotographic apparatus according to claim 2, wherein the reinforcement material comprises at least one kind of silica and carbon.

4. The elastic roll for an electrophotographic apparatus according to claim 3, wherein the content of the reinforcement material is within the range of 0.5 to 15 parts by mass with respect to 100 parts by mass of the cross-linked silicone rubber.

5. The elastic roll for an electrophotographic apparatus according to claim 4, wherein the plurality of air bubbles have an average diameter of 50 μm or less.

6. The elastic roll for an electrophotographic apparatus according to claim 5, further comprising a skin layer on an outer peripheral surface of the foamed elastic body layer.

7. The elastic roll for an electrophotographic apparatus according to claim 6, wherein the shaft body and the foamed elastic body layer are bonded to each other via an adhesive agent having a functional group that reacts to water.

8. The elastic roll for an electrophotographic apparatus according to claim 7, wherein the resin of the resin microparticles is a thermosetting resin.

9. The elastic roll for an electrophotographic apparatus according to claim 7, wherein the resin of the resin microparticles is at least one selected from an epoxy resin, an acrylic resin, a polyvinyl butyral resin, a styrene-based polymer, and a silicone resin.

10. The elastic roll for an electrophotographic apparatus according to claim 9, wherein the cross-linking catalyst in the microcapsule type catalyst comprises metal atoms in the range of 0.01% to 5% by mass.

11. The elastic roll for an electrophotographic apparatus according to claim 2, wherein the resin of the resin microparticles is a thermosetting resin.

12. The elastic roll for an electrophotographic apparatus according to claim 2, wherein the resin of the resin microparticles is at least one selected from an epoxy resin, an acrylic resin, a polyvinyl butyral resin, a styrene-based polymer, and a silicone resin.

13. The elastic roll for an electrophotographic apparatus according to claim 12, wherein the cross-linking catalyst in the microcapsule type catalyst comprises metal atoms in the range of 0.01% to 5% by mass.

14. The elastic roll for an electrophotographic apparatus according to claim 2, wherein the resin of the resin microparticles is a copolymer of ethyl methacrylate and methyl methacrylate.

15. The elastic roll for an electrophotographic apparatus according to claim 1, wherein the content of the reinforcement material is within the range of 0.5 to 15 parts by mass with respect to 100 parts by mass of the cross-linked silicone rubber.

16. The elastic roll for as electrophotographic apparatus according to claim 1, wherein the plurality of air bubbles have an average diameter of 50 μm or less.

17. The elastic roll for an electrophotographic apparatus according to claim 1, wherein the resin of the resin microparticles is a thermosetting resin.

18. The elastic roll for an electrophotographic apparatus according to claim 1, wherein the resin of the resin microparticles is at least one selected from an epoxy resin, an acrylic resin, a polyvinyl butyral resin, a styrene-based polymer, and a silicone resin.

19. The elastic roll for an electrophotographic apparatus according to claim 1, wherein the resin of the resin microparticles is a copolymer of ethyl methacrylate and methyl methacrylate.

20. The elastic roll for an electrophotographic apparatus according to claim 7, wherein, the resin of the resin microparticles is a copolymer of ethyl methacrylate and methyl methacrylate.

* * * * *